US012768319B2

(12) United States Patent
Wall, II et al.

(10) Patent No.: US 12,768,319 B2
(45) Date of Patent: Oct. 20, 2026

(54) SYSTEMS AND METHODS FOR AN ON-BOARD AMMONIA CRACKING SYSTEM WITH AN EXHAUST GAS CRACKING BYPASS FOR COLD START CONDITIONS

(71) Applicant: First Ammonia Motors, Inc., Concord, NC (US)

(72) Inventors: James L. Wall, II, Concord, NC (US); David Gwynn Kapp, Jr., Concord, NC (US); James Francis Lamb, Concord, NC (US)

(73) Assignee: First Ammonia Motors, Inc., Concord, NC (US)

( * ) Notice: Subject to any disclaimer, the term of this patent is extended or adjusted under 35 U.S.C. 154(b) by 25 days.

(21) Appl. No.: 19/375,818

(22) Filed: Oct. 31, 2025

(65) Prior Publication Data

US 2026/0055748 A1 Feb. 26, 2026

Related U.S. Application Data

(63) Continuation-in-part of application No. 19/347,959, filed on Oct. 2, 2025, which is a continuation of
(Continued)

(51) Int. Cl.
*F02M 25/12* (2006.01)
*C01B 3/047* (2026.01)
(Continued)

(52) U.S. Cl.
CPC ......... *F02M 21/0227* (2013.01); *C01B 3/047* (2013.01); *F02M 21/0206* (2013.01);
(Continued)

(58) Field of Classification Search
None
See application file for complete search history.

(56) References Cited

U.S. PATENT DOCUMENTS 4,480,595 A 11/1984 Hobby et al.
5,976,723 A 11/1999 Boffito et al.
(Continued)

FOREIGN PATENT DOCUMENTS

CN 114165330 A 3/2022
CN 114183242 A * 3/2022 ........... F02M 55/025
(Continued)

OTHER PUBLICATIONS

Comotti et al., "Hydrogen generation system for ammoniae hydrogen fuelled internal combustion engines", International Journal of Hydrogen Energy 40(33):10673-10686, Sep. 2015.
(Continued)

*Primary Examiner* — Jennifer A Leung

(57) ABSTRACT

The present invention relates, in general, to systems and methods for generating hydrogen from ammonia on-board vehicles, where the produced hydrogen is used as fuel source for an internal combustion engine. The present invention comprises an exhaust heat cracking unit and an electric cracking unit fluidly connected by a controllable bypass path. When exhaust heat from the engine is unavailable, the bypass path redirects the gaseous ammonia flow away from the unheated exhaust heat cracking unit and directly into the electric cracking unit. This configuration prevents the introduction of cold or partially condensed ammonia into the exhaust heat cracking unit passages, thereby mitigating condensation, volume expansion, and thermal stress that could otherwise result in structural damage or thermal shock within the exhaust heat exchanger. The system enables seamless transition between heat sources, ensuring safe and efficient operation across dynamic vehicle or operating and power conditions.

20 Claims, 20 Drawing Sheets

Related U.S. Application Data application No. 18/241,321, filed on Sep. 1, 2023, now Pat. No. 12,467,422, which is a continuation-in-part of application No. 17/986,265, filed on Nov. 14, 2022, now Pat. No. 11,840,449.

(60) Provisional application No. 63/395,820, filed on Aug. 6, 2022.

(51) Int. Cl.

| | |
|---|---|
| ***F02M 21/02*** | (2006.01) |
| ***F02M 21/06*** | (2006.01) |
| ***F02M 27/02*** | (2006.01) |

(52) U.S. Cl.

CPC ...... *F02M 21/0218* (2013.01); *F02M 21/023* (2013.01); *F02M 21/06* (2013.01); *F02M 25/12* (2013.01); *F02M 27/02* (2013.01); *C01B 2203/0277* (2013.01); *C01B 2203/0811* (2013.01); *C01B 2203/085* (2013.01); *C01B 2203/1035* (2013.01); *C01B 2203/141* (2013.01); *C01B 2203/142* (2013.01); *Y02E 60/36* (2013.01)

(56) References Cited

U.S. PATENT DOCUMENTS

| | | | |
|---|---|---|---|
| 6,588,211 | B2 | 7/2003 | Friebe et al. |
| 6,936,363 | B2 | 8/2005 | Kordesch et al. |
| 7,867,300 | B2 | 1/2011 | Chellappa et al. |
| 8,025,033 | B2 | 9/2011 | Schiltz et al. |
| 8,166,926 | B2 | 5/2012 | Sasaki et al. |
| 8,272,353 | B2 | 9/2012 | Dincer et al. |
| 8,561,578 | B2 | 10/2013 | Miyagawa et al. |
| 8,904,765 | B2 | 12/2014 | Miyagawa et al. |
| 8,961,923 | B2 | 2/2015 | Grannell et al. |
| 9,249,720 | B2 | 2/2016 | Miyagawa et al. |
| 9,506,400 | B2 | 11/2016 | Tange et al. |
| 10,961,890 | B2 | 3/2021 | Sung et al. |
| 11,286,831 | B2 | 3/2022 | Al-Rub et al. |
| 11,421,629 | B2 | 8/2022 | Takeuchi |
| 11,578,686 | B2 | 2/2023 | Takeuchi et al. |
| 11,834,334 | B1 | 12/2023 | Jo et al. |
| 11,840,449 | B1 | 12/2023 | Wall, II |
| 11,981,562 | B2 | 5/2024 | Wall, II |
| 2002/0028171 | A1 | 3/2002 | Goetsch et al. |
| 2011/0036309 | A1 | 2/2011 | McAlister |
| 2011/0293510 | A1 | 12/2011 | Grannell et al. |
| 2013/0025547 | A1 | 1/2013 | Nakagawa |
| 2014/0238316 | A1 | 8/2014 | Tange et al. |
| 2014/0356738 | A1 | 12/2014 | Bell et al. |
| 2015/0330280 | A1 | 11/2015 | Yamamoto et al. |
| 2018/0230006 | A1 | 8/2018 | Finkelshtain et al. |
| 2022/0268200 | A1 | 8/2022 | Seba |
| 2023/0053230 | A1 | 2/2023 | Jo et al. |

FOREIGN PATENT DOCUMENTS

| | | | | | |
|---|---|---|---|---|---|
| CN | 116608061 A | * | 8/2023 | ......... | F02M 21/0206 |
| CN | 117386531 A | * | 1/2024 | ......... | B01D 53/9409 |
| WO | 02086987 A2 | | 10/2002 | | |
| WO | WO-2011004344 A1 | * | 1/2011 | ............... | C25B 9/05 |

OTHER PUBLICATIONS

Ammonigy GMBH, "Part 1: With ammonia to CO2-free and cost-effective heavy-duty transport", 2022.

De Vries, "Safe and effective application of ammonia as a marine fuel", Delft University of Technology, 2019.

Abd Ali et al., "Ammonia as Hydrogen Storage Media, Sustainable Method to Hydrogen Evolution", 2018 J. Phys.: Conf. Ser. 1032.

* cited by examiner

SYSTEMS AND METHODS FOR AN ON-BOARD AMMONIA CRACKING SYSTEM WITH AN EXHAUST GAS CRACKING BYPASS FOR COLD START CONDITIONS

CROSS REFERENCE TO RELATED APPLICATIONS

This application is a continuation-in-part of U.S. patent application Ser. No. 19/347,959 entitled "SYSTEMS AND METHODS FOR SUPPLYING GASEOUS AMMONIA TO SERIALLY-CONNECTED AMMONIA CRACKING UNITS" filed on Oct. 2, 2025, which is a continuation of U.S. patent application Ser. No. 18/241,321 entitled "SYSTEMS AND METHODS FOR THE ON-BOARD CATALYTIC PRODUCTION OF HYDROGEN FROM PHASE-CONTROLLED GASEOUS AMMONIA" filed on Sep. 1, 2023, which is a continuation-in-part of U.S. Pat. No. 11,840,449 entitled "SYSTEMS AND METHODS FOR THE CATALYTIC PRODUCTION OF HYDROGEN FROM AMMONIA ON-BOARD MOTOR VEHICLES" issued on Dec. 12, 2023, which claims the benefit of U.S. Provisional Patent Application Ser. No. 63/395,820 entitled "SYSTEMS AND METHODS FOR THE CATALYTIC PRODUCTION OF HYDROGEN FROM AMMONIA ON-BOARD MOTOR VEHICLES" filed on Aug. 6, 2022, U.S. Provisional Patent Application Ser. No. 63/355,959 entitled "SYSTEMS AND METHODS FOR THE CATALYTIC PRODUCTION OF HYDROGEN FROM AMMONIA ON-BOARD MOTOR VEHICLES" filed on Jun. 27, 2022, and U.S. Provisional Patent Application Ser. No. 63/312,121 entitled "SYSTEMS AND METHODS FOR THE CATALYTIC PRODUCTION OF HYDROGEN FROM AMMONIA ON-BOARD MOTOR VEHICLES" filed on Feb. 21, 2022, all of which are commonly owned, the disclosure of each is incorporated herein by reference in their entireties.

BACKGROUND

Field of the Invention

The present invention relates, in general, to systems and methods for generating hydrogen from ammonia on-board vehicles, where the produced hydrogen is used as fuel source for an internal combustion engine.

Description of Related Art

The increase in the overall temperature on and above Earth's surface represents a critical challenge facing the planet. Earth's climate is significantly changing mainly due to human activities, and the transportation sector plays a prominent role in this global warming. For example, internal combustion engines have traditionally burned fossil fuels, which in turn produces $CO_2$, a known contributor to global warming. Over the last decade, the transportation sector has made strides in making electric- and hybrid-powered vehicles available on a mass scale. Generally speaking, most electric and hybrid vehicles sold today tend to produce significantly fewer global warming emissions than most vehicles operating on fossil fuels, namely gasoline. However, the environmental benefits of electric and hybrid vehicles still depend primarily on how much fossil fuel is being burned to charge these vehicles. For example, if the vehicles are charged using a coal-heavy power grid, the environmental benefits are lessened.

Furthermore, the batteries and fuel cells in electrified vehicles rely on raw materials such as cobalt, lithium and rare earth elements. These materials have been linked to grave environmental and human rights concerns. For instance, cobalt has been especially problematic. Mining cobalt produces hazardous tailings and slags that can leach into the environment, and studies have found high exposure rates of cobalt and other metals in communities surrounding cobalt mining and processing facilities. Extracting such metals from their ores also requires a process called smelting, which can emit sulfur oxide and other harmful air pollution.

Given the sustained environmental issues that currently exist with electrified vehicles, ammonia has been suggested as an alternative to fossil fuels for use in internal combustion engines, given its relatively high energy density and zero $CO_2$ emissions when combusted. However, pure ammonia cannot efficiently be used as a fuel in small internal combustion engines, whether spark-ignited (i.e., gasoline), or compression ignited (i.e., diesel), because pure ammonia burns too slowly to complete combustion during the power stroke in a four-stroke engine operating at speeds of thousands of revolutions per minute (RPM). In other words, when ammonia is combusted, the combustion produces a flame with a relatively low propagation speed. This low combustion rate of ammonia causes combustion to be inconsistent under low engine load and high engine speed operating conditions.

Prior approaches to fueling combustion engines with ammonia have required mixing ammonia with a secondary combustion promoter fuel, such as gasoline, liquefied petroleum, or diesel. However, the requirement for a secondary combustion promoter fuel fluctuates with varying engine loads and engine speed, which can cause control issues. Thus, using a secondary combustion promotor fuel typically requires an additional control mechanism that must be part of the engine management system.

Hydrogen has also been suggested as an alternative to fossil fuels for use in internal combustion engines, as it is extremely plentiful, and can match the power of gasoline or diesel given its lower heating value. Hydrogen has a high flame velocity and a low ignition temperature, making it easy to ignite, and it is known to burn approximately six times faster than gasoline. Most importantly, hydrogen produces zero $CO_2$ emissions when combusted.

However, a challenge with using hydrogen on-board a vehicle is that it is an extremely light, low-density gas, and it cannot be stored as easily as liquid fossil fuels. Hydrogen requires compression, cooling, or a combination of both. The use of compressed hydrogen fuel tanks on-board vehicles inherently leads to a number of safety issues, such as the risk of potential failure of the pressure vessel, leakage of hydrogen in a confined space, and the like.

It is known that hydrogen can be obtained from ammonia by catalytic decomposition into its constituent hydrogen and nitrogen components through a process referred to as "cracking". However, the ammonia cracking process is an endothermic process which requires heat. With a limited electrical supply on-board a motor vehicle, it is difficult to generate the heat required to efficiently perform the ammonia crack on-board.

Therefore, there is a need for systems and methods to generate hydrogen from ammonia on-board vehicles for use as an internal combustion engine fuel source which addresses the aforementioned challenges and drawbacks of electrified vehicles, ammonia-fueled internal combustion engines, and the on-board storage of hydrogen for hydrogen fueled internal combustion engines.

SUMMARY

In an embodiment, the present invention is directed to an on-board ammonia cracking system for supplying hydrogen fuel to an internal combustion engine, the system comprising: an ammonia tank containing ammonia; an exhaust gas cracking unit; an electric cracking unit coupled to the exhaust gas cracking unit; and a bypass system coupled to the ammonia tank, the exhaust gas cracking unit, and the electrical cracking unit, wherein the bypass system routes ammonia from the ammonia tank to the exhaust gas cracking unit when the internal combustion engine is producing exhaust gas having a temperature sufficient to facilitate ammonia cracking, and wherein the bypass system routes ammonia to the electric cracking unit when the internal combustion engine is not producing exhaust gas having a temperature sufficient to facilitate ammonia cracking.

In another embodiment, the present invention is directed to an on-board ammonia cracking system for supplying hydrogen fuel to an internal combustion engine, the system comprising: an ammonia tank containing ammonia; an exhaust gas cracking unit; an electric cracking unit coupled in series to the exhaust gas cracking unit; a first valve coupled between the ammonia tank and the exhaust gas cracking unit; a second valve coupled between the ammonia tank and the electric cracking unit; and an electronic control unit (ECU) coupled to the first valve and the second valve, wherein the ECU closes the first valve to prevent ammonia flow to the exhaust gas cracking unit and opens the second valve to allow ammonia flow to the electric cracking unit when the internal combustion engine is not producing exhaust gas having a temperature sufficient to facilitate ammonia cracking.

In yet another embodiment, the present invention is directed to an on-board ammonia cracking system for supplying hydrogen fuel to an internal combustion engine, the system comprising: an ammonia tank containing ammonia; an exhaust gas cracking unit; an electric cracking unit coupled in series to the exhaust gas cracking unit; a first valve coupled between the ammonia tank and the exhaust gas cracking unit; a second valve coupled between the ammonia tank and the electric cracking unit; a check valve coupled between the second valve and the electric cracking unit; and an electronic control unit (ECU) coupled to the first valve and the second valve, wherein the ECU closes the first valve to prevent ammonia flow to the exhaust gas cracking unit and opens the second valve to allow ammonia flow to the electric cracking unit when the internal combustion engine is not producing exhaust gas having a temperature sufficient to facilitate ammonia cracking.

BRIEF DESCRIPTION OF THE DRAWINGS

These and other embodiments of the present invention will be discussed with reference to the following exemplary and non-limiting illustrations, in which like elements are numbered similarly, and where.

DEFINITIONS

Figure 1:
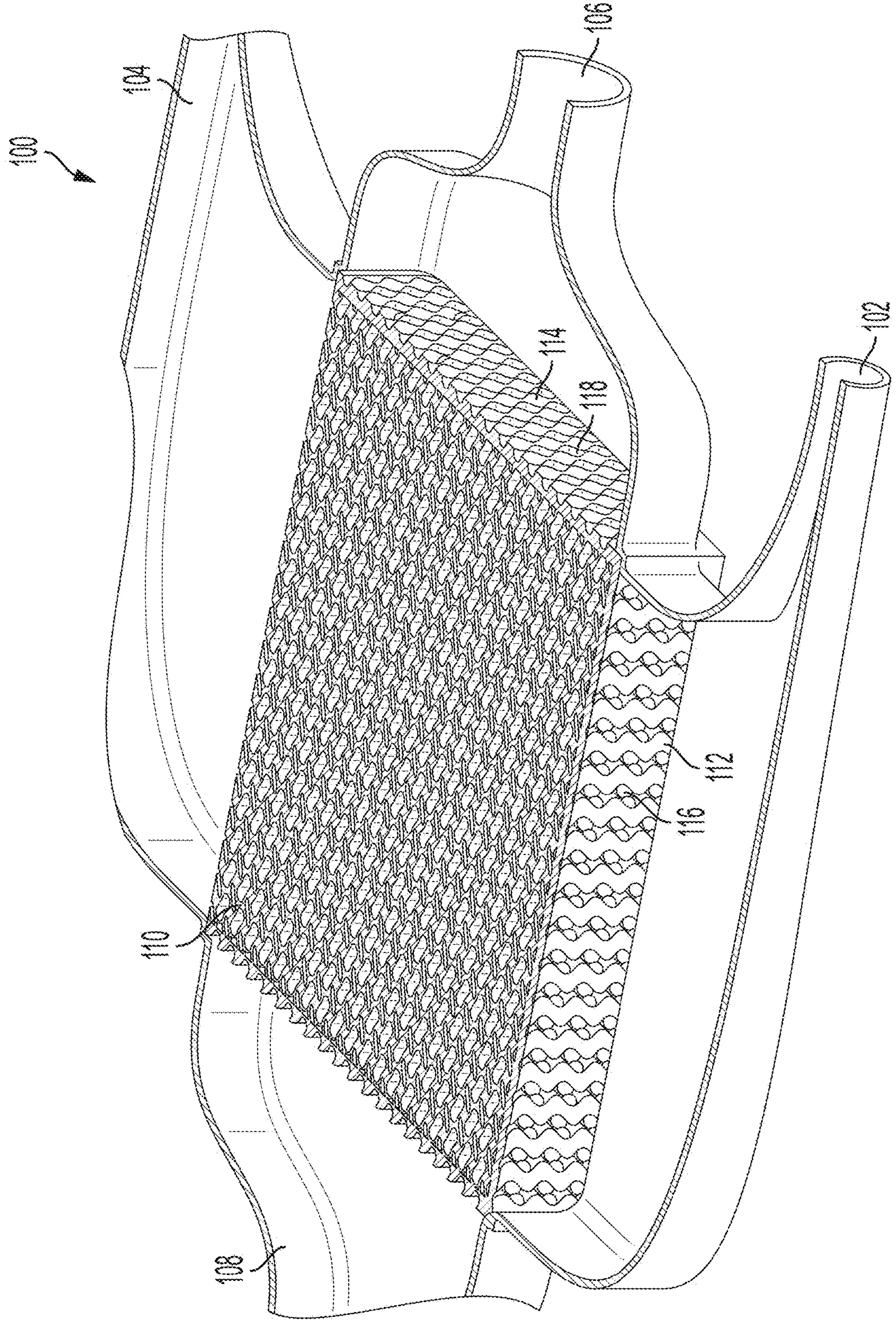
FIG. 1 is a perspective internal view of an exchange cracking unit that utilizes a TPMS structure, according to an embodiment of the present invention.

The following definitions are meant to aid in the description and understanding of the defined terms in the context of the present invention. The definitions are not meant to limit these terms to less than is described throughout this specification. Such definitions are meant to encompass grammatical equivalents.

As used herein, the term "motor vehicle" refers to any moving vehicle that is capable of carrying one or more human occupants and/or cargo, or which is capable of performing a task, and which is powered by any form of energy. The term "motor vehicle" includes, but is not limited to: (a) vehicles such as cars, trucks, vans, minivans, sport utility vehicles, passenger carrying vehicles, goods carrying vehicles, 2-, 3-, and 4-wheeled vehicles, quadricycles, motorcycles, scooters, all-terrain vehicles, utility task vehicles, and the like; (b) airborne vehicles such as helicopters, airplanes, airships, drones, aerospace vehicles, and the like; (c) marine vessels such as dry cargo ships, liquid cargo ships, specialized cargo ships, tug-boats, cruise ships, recreational boats, fishing boats, personal watercraft, jet skis, and the like; (d) locomotives; and (e) heavy equipment and machinery, power generators, lawnmowers and tractors, agricultural equipment and machinery, forestry equipment and machinery, construction equipment and machinery, mining equipment and machinery, and the like.

As used herein, the term "internal combustion engine" refers to any engine, spark ignition gasoline engine, compression ignition diesel engine, rotary, reciprocating, or other engine wherein combustion takes place in a combustion chamber, such that the products of combustion, together with any other by-products, perform work by exerting force on a moving surface from which the mechanical output is obtained from the engine. The term "internal combustion engine" includes, but is not limited to, hybrid internal combustion engines, two-stroke engines, four-stroke engines, six-stroke engines, and the like.

As used herein, the term "catalyst" refers to a material that promotes a chemical reaction. The term "catalyst" includes, but is not limited to, a catalyst or catalysts capable of promoting cracking reactions, such as ammonia cracking reactions, whether used as base catalyst(s) and/or additive catalyst(s). The catalyst, for the purposes of the present invention, can include, but is not limited to, a non-stoichiometric lithium imide, nickel, iron, cobalt, iron cobalt, ruthenium, vanadium, palladium, rhodium, platinum, sodium amide, and the like, as well as various combinations thereof.

As used herein, the term "cracking" refers to a process or processes by which ammonia is decomposed into constituent hydrogen and nitrogen components over at least one catalyst.

As used herein, the terms "cracking unit" and "catalyst unit", used interchangeably, refer to a reactor assembly, system, or module that is configured to thermally and/or catalytically decompose ammonia into a hydrogen-rich product gas stream comprising hydrogen and nitrogen. The cracking unit may include, but is not limited to, one or more reaction chambers, catalyst beds, heating elements, heat exchangers, flow channels, insulation layers, or integrated subsystems designed to facilitate the dissociation of ammonia.

As used herein, the term "nickel alloy" refers to pure nickel or an alloy containing nickel as a main component. The term "nickel alloy" includes, but is not limited to, Inconel® 625, Inconel® 718, Inconel® 725, and other compound metals having nickel as a main component. Inconel® is the trademark of Special Metals Corporation of Huntington, West Virginia.

As used herein the term "triply-periodic minimal surface (TPMS)" refers to mathematically defined structures that repeat in three dimensions with zero mean curvatures and large surface areas.

As used herein, the term "fossil fuel" refers to any carbon compound- or hydrocarbon-containing material, and includes coal, petroleum, oil, and natural gas, as well as fuels derived from physical separations, transformations, and/or reformulations of these materials, including, but not limited to, motor gasoline, diesel fuel, gasohol, kerosene, propane, and any of the foregoing materials in combination.

As used herein, the term "coolant" refers to a fluid that is transported through and/or around components to control the temperature of these components. The coolant may in some cases remove heat from the components to cool the components, or in other cases, the coolant may transfer heat contained therein to the components to heat the components. The coolant may be an inorganic additive technology (IAT) coolant (such as ethylene glycol in the form of a conventional low-silicate coolant (i.e., antifreeze), a fully-formulated coolant, or an extended life coolant), an organic acid technology (OAT) coolant, and/or a hybrid organic acid technology (HOAT) coolant. Further, the coolant may be any medium which is capable of transferring heat, such as water, refrigerants, betaine, polyalkylene glycol, propylene glycol, oil, liquified gases, nanofluids, and the like.

As used herein, the terms "gaseous ammonia", "vapor ammonia", "ammonia gas" and "ammonia vapor" refer to ammonia in a vapor-phase state, meaning that the ammonia exists substantially in the form of a gas rather than as a liquid or mixed-phase fluid. Gaseous ammonia may be produced by vaporizing or evaporating liquid ammonia through heat exchange, pressure reduction, or a combination thereof. For the purposes of this invention, "gaseous ammonia" is distinguished from "liquid ammonia," which refers to ammonia maintained under conditions of temperature and pressure sufficient to preserve it in a substantially liquid state.

As used herein, the terms "mixed-phase ammonia" and "mixed-phase mixture" refer to a two-phase fluid composition comprising both liquid-phase ammonia and vapor-phase ammonia coexisting in thermodynamic equilibrium or near-equilibrium conditions. The mixed-phase state is typically produced by a controlled pressure reduction (for example, across an expansion valve) or by partial heating of liquid ammonia, resulting in partial vaporization of the liquid. The term "mixed-phase" distinguishes this intermediate condition from "liquid ammonia," which is substantially free of vapor, and "gaseous ammonia," which is substantially free of liquid.

DETAILED DESCRIPTION

It should be understood that aspects of the present invention are described herein with reference to the figures, which show illustrative embodiments. The illustrative embodiments herein are not necessarily intended to show all embodiments in accordance with the invention, but rather are used to describe a few illustrative embodiments. Thus, aspects of the invention are not intended to be construed narrowly in view of the illustrative embodiments. In addition, although the present invention is described with respect to its application for an internal combustion engine for a motor vehicle, it is understood that the system could be implemented in any engine-driven setting that may be powered by ammonia and/or hydrogen fuel.

FIG. 1 is a perspective internal view of a heat exchange cracking unit that utilizes a TPMS structure, and which serves as a heat exchanger as well as a catalytic converter that performs ammonia cracking. The heat exchange cracking unit 100 is metallic, and in an embodiment, includes a gaseous ammonia inlet 102, a hydrogen outlet 104, a heated exhaust gas inlet 106, and an exhaust gas outlet 108. In an embodiment, the heat exchange cracking unit 100 is made from a nickel alloy. In a preferred embodiment, the heat exchange cracking unit 100 is made from Inconel® 625.

In an embodiment, the gaseous ammonia inlet 102, the hydrogen outlet 104, the heated exhaust gas inlet 106, and the exhaust gas outlet 108 can be made from the same metallic material as the heat exchange cracking unit 100. In another embodiment, the gaseous ammonia inlet 102, the hydrogen outlet 104, the heated exhaust gas inlet 106, and the exhaust gas outlet 108 can be made from stainless steel, silver, bronze, and comparable alloys.

Positioned between the inlets 102, 106 and outlets 104, 108 is a matrix 110. The matrix 110 is formed from width-wise surfaces 112 and length-wise surfaces 114 which run generally perpendicular to each other. The surfaces 112, 114 of the matrix 110 create passages that allow the gaseous ammonia and heated exhaust gas to flow; these passages are indicated by the ammonia channels 116 and heated exhaust gas channels 118. Gaseous ammonia is supplied to heat exchange cracking unit 100 via inlet 102, while heated exhaust gas is concurrently supplied to inlet 106. The gaseous ammonia traverses the matrix 110 via ammonia channels 116, while the heated exhaust gas traverses the matrix via heated exhaust gas channels 118. The ammonia channels 116 and the heated exhaust gas channels 118 are orientated in a generally perpendicular fashion to one another, such that the gaseous ammonia traverses the matrix 110 at approximate right angles relative to the heated exhaust gas.

In an embodiment, the surfaces 112, 114 have a thickness of 1 to 2 millimeters, and each of the surfaces 112, 114 can have the same thickness. In another embodiment, the surfaces 112, 114 can each have a different thickness. In yet another embodiment, the surfaces 112, 114 may vary in thickness as they each traverse across the matrix 110. For example, the surfaces 112, 114 may not have a uniform thickness across the width of the matrix 110, and may have thicker or narrower portions at various locations.

As shown in FIG. 1, the matrix 110 physically separates the gases passing through each of the channels 116, 118, thereby providing an exceptionally large surface area throughout the matrix 110 where the heated exhaust gas exchanges its heat with the gaseous ammonia. In an embodiment, the surfaces 112, 114 of the matrix 110 are coated with a catalyst that facilitates the cracking of ammonia into constituent hydrogen and nitrogen components. In this embodiment, the surfaces 112, 114 of the matrix 110 are coated with the catalyst using a washcoating or deposition technique to bind or adhere the catalyst to the surfaces 112, 114.

In another embodiment, catalyst in the form of discrete catalyst media is deposited into the passages forming the ammonia channels 116 and heated exhaust gas channels 118. The discrete catalyst media can be porous, allowing the gaseous ammonia and exhaust gas to pass through the catalyst as they each flow through the matrix 110.

In yet another embodiment, the surfaces 112, 114 of the matrix 110 can be coated with a catalyst as described herein, and additional discrete catalyst media can be deposited into the passages forming the ammonia channels 116 and heated exhaust gas channels 118.

In an embodiment, the matrix 110 is metallic, and is made from a nickel alloy. In a preferred embodiment, the matrix 110 is made from Inconel® 625. The heat exchange cracking unit 100 and matrix 110 may be constructed from the same metallic material. In another embodiment, the heat exchange cracking unit 100 and matrix 110 can be constructed from different metallic materials.

The material(s) selected for the heat exchange cracking unit 100 and matrix 110 need to have the ability to withstand the corrosive environment resulting from the high-temperature heated exhaust gas, as well as the heated hydrogen gas which is generated from the cracking of ammonia.

In a preferred embodiment, the matrix 110 is in the form of a triply-periodic minimal surface (TPMS), and the matrix 110 is three-dimensionally (3D) printed using powdered metal. The 3D printing process is an additive manufacturing process that uses laser sintering to selectively fuse together particles of the powdered metal into a TPMS structure in a layer-by-layer strategy. The TPMS structure of the matrix 110 provides for a relatively large surface area comprising cells which can be confined within the dimensions and shape of the heat exchange cracking unit 100.

The TPMS structure can take on a variety of crystalline-like structures which have different patterns and profiles. In the embodiment shown in FIG. 1, the TPMS is a gyroid structure. The structures can be in the form of, but are not limited to, gyroid, diamond, orthogonal holes, split pea, among many others. Each of these forms has a different surface area. For example, in the embodiment shown in FIG. 1, the heat exchange cracking unit 100 has dimensions of approximately 10×10×4 inches. For a matrix 110 which fits within these dimensions, Table 1 provides approximate surface area values for the various TPMS structure that may be utilized:

TABLE 1

| Structure | Surface Area (million millimeters$^2$) |
|---|---|
| Gyroid | 1.5 million mm$^2$ |
| Orthogonal holes | 1.6 million mm$^2$ |
| Split pea | 2.1 million mm$^2$ |
| Diamond | 2.5 million mm$^2$ |

It is noted however, that the values in Table 1 are illustrative examples only and are not intended to be in any way limiting. The individual cell sizes of the TPMS can be modified to increase or decrease the surface area of the matrix 110. For example, within the same volume of the heat exchange cracking unit 100, the individual cell size can be increased to increase the overall surface area of the matrix 110, and conversely, the individual cell size can be decreased to decrease the overall surface area of the matrix 110.

The TPMS structure is ideal for the matrix 110 as it allows heat to be distributed to all surfaces of the matrix 100, thereby facilitating the chemical reaction required for the ammonia cracking process. As the surface area of the matrix 110 increases, there is an inherent challenge in cleaning the surfaces of the matrix 110 after it is printed, given that the formation of the channels 116, 118 become narrower relative to one another as the surface area increases. However, as the cell size of the matrix 110 increases, the surface area decreases, which decreases the throughput efficiency of the heat exchange cracking unit 100. The surface area of the matrix 110 can depend on the power requirements of the motor vehicle and its engine.

In an embodiment, the heat exchange cracking unit 100 is sized and dimensioned to accommodate a matrix 110 with sufficient surface area to facilitate the cracking process, while still having a form factor that is suitable for placement within a motor vehicle. The dimensions of the heat exchange cracking unit 100 can vary, and can range from 5 to 30 inches in width, 5 to 30 inches in length, and 0.5 to 12 inches in height.

In an embodiment, the heat exchange cracking unit 100 has a generally square shape which accommodates a square-shaped matrix 110, as shown in FIG. 1, which is an illustrative example only and is not intended to be in any way limiting. In other embodiments, the heat exchange cracking unit 100 can be any polygonal shape, such as, for example, oval, oblong, triangular, square, kite-shaped, trapezoid, parallelogram, rhombus, and the like, as well as various 3D shapes such as, for example, cube, cuboid, sphere, cone, and the like.

In an embodiment, the ammonia inlet 102 has a smaller diameter than the heated exhaust gas inlet 106, as the exhaust gas flow rate may be orders of magnitude higher than the ammonia flow rate. As with the dimensions of the heat exchange cracking unit 100, the diameters, shape, and sizes of the inlets 102, 106, and outlets 104, 108 can vary based on the power requirements of the motor vehicle and its engine.

Figure 2:
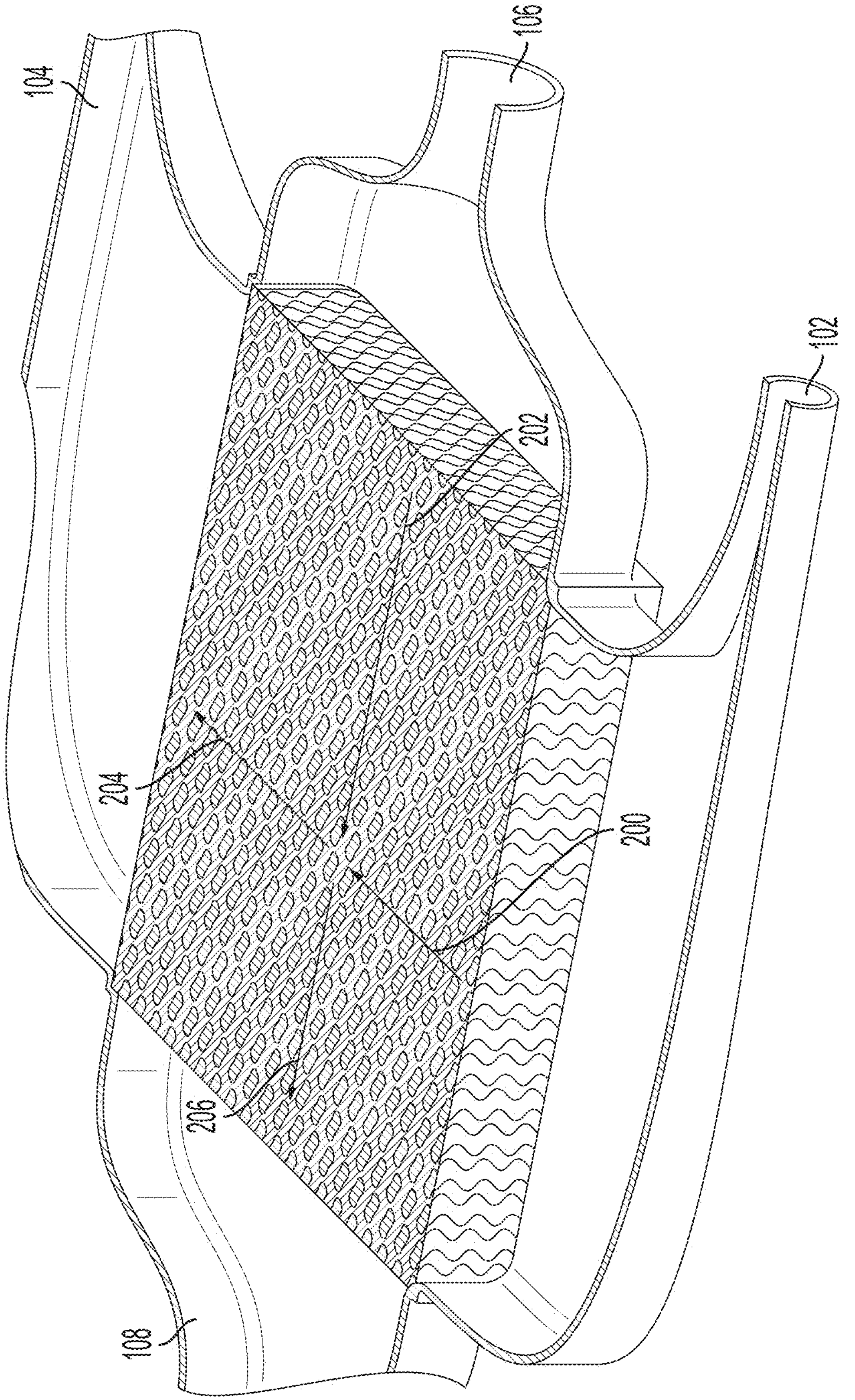
FIG. 2 is a perspective internal view of the heat exchange cracking unit that utilizes a TPMS structure which depicts the flow of heated exhaust gas and gaseous ammonia through the matrix, according to an embodiment of the present invention.

FIG. 2 is a perspective internal view of the heat exchange cracking unit 100 that utilizes a TPMS structure which depicts the flow of heated exhaust gas and gaseous ammonia through the matrix. In operation, gaseous ammonia 200 is supplied to the inlet 102 and flows through the ammonia channels 116, while heated exhaust gas 202 is concurrently supplied to the inlet 106 and flows through the heated gas channels 118. The heated exhaust gas 202 heats the catalyst, resulting in cracking of the gaseous ammonia 200 into constituent hydrogen and nitrogen components 204. The resulting hydrogen and nitrogen components 204 exit the heat exchange cracking unit 100 via the outlet 104 and are supplied to the downstream injection system for the engine, while residual exhaust gas 206 exits the heat exchange cracking unit via the outlet 108.

Figure 3:
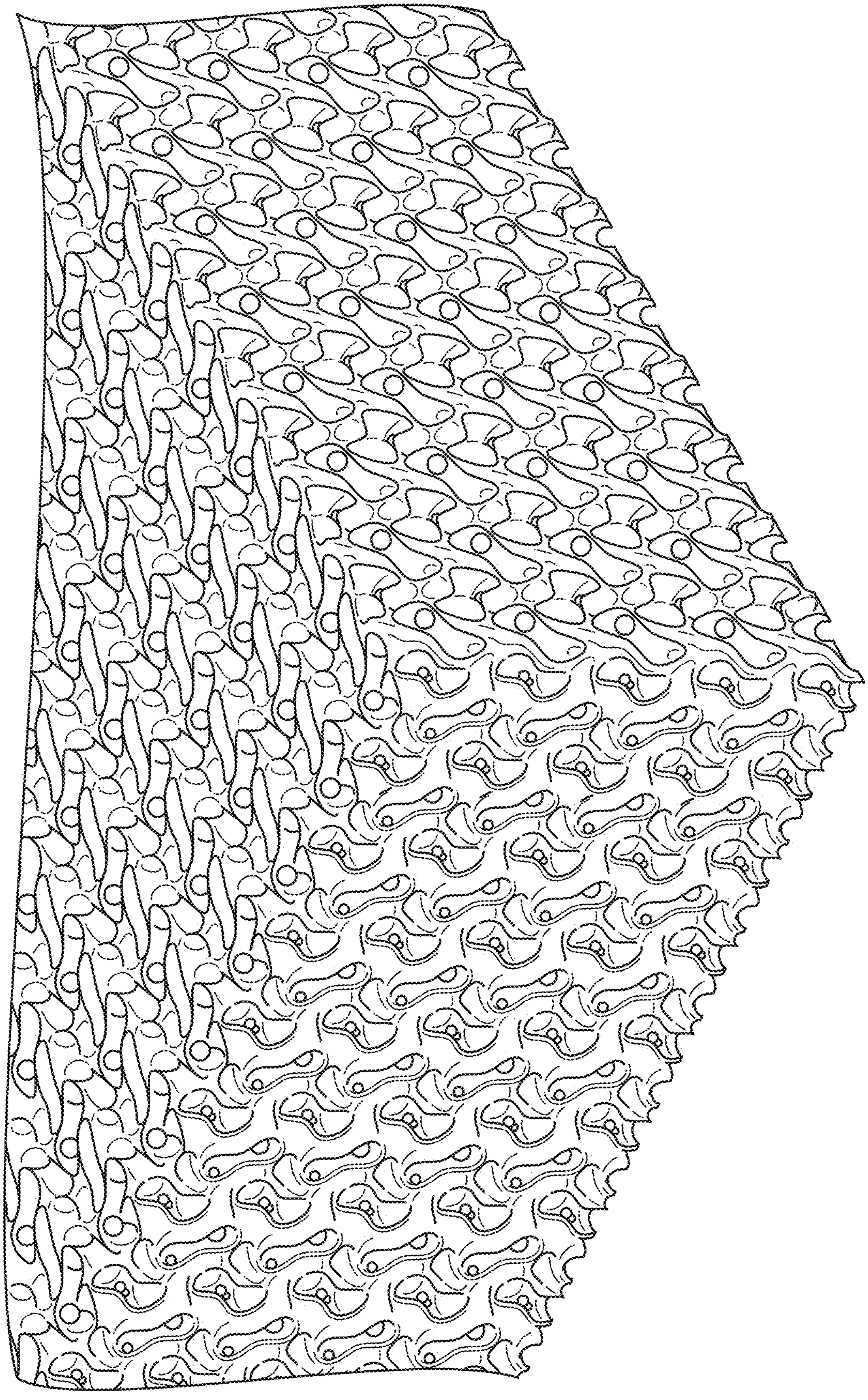
FIG. 3 is a perspective view of the matrix having a gyroid TPMS structure, according to an embodiment of the present invention.
Figure 4:
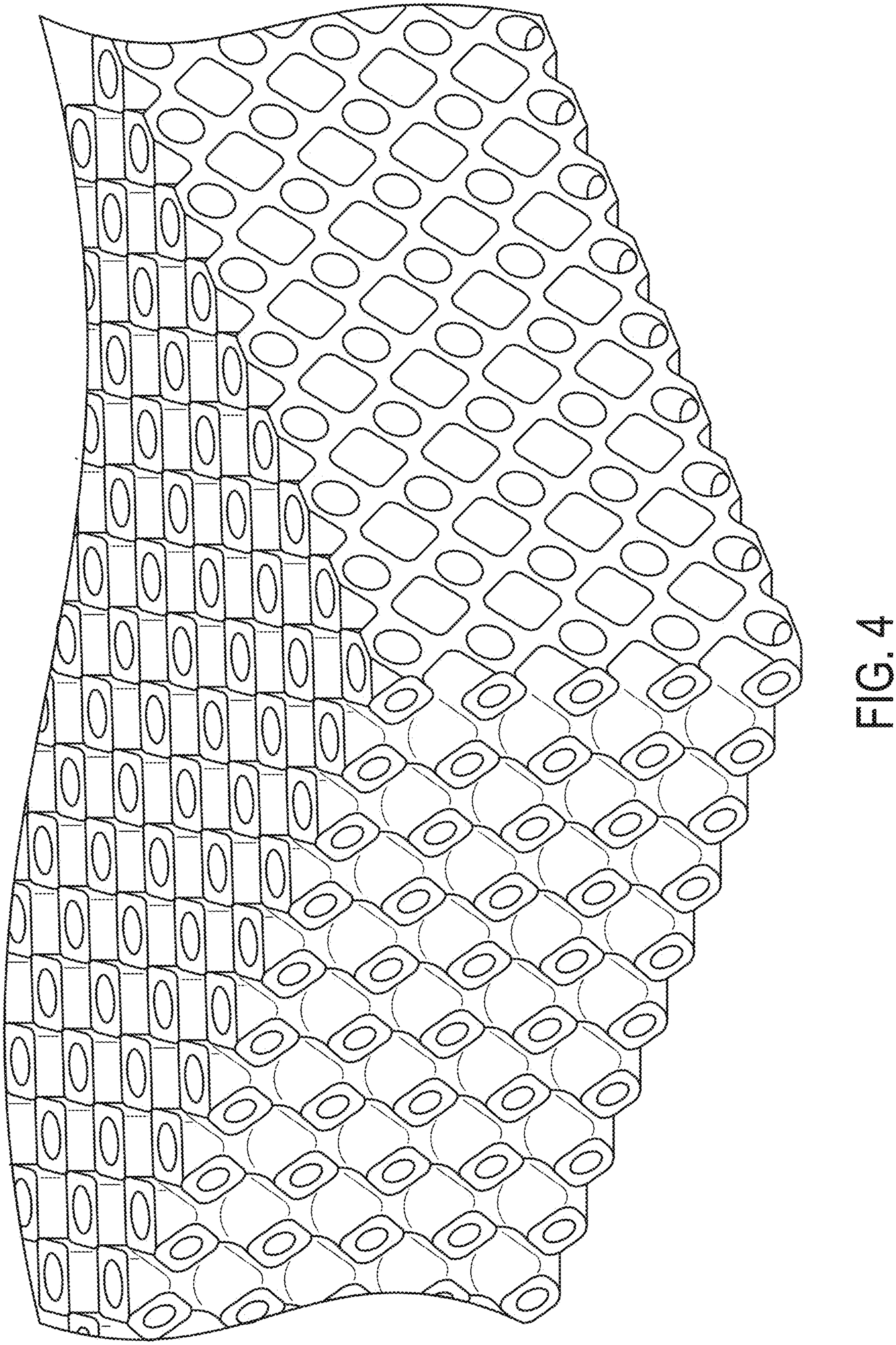
FIG. 4 is a perspective view of the matrix having an orthogonal hole TPMS structure, according to an embodiment of the present invention.
Figure 5:
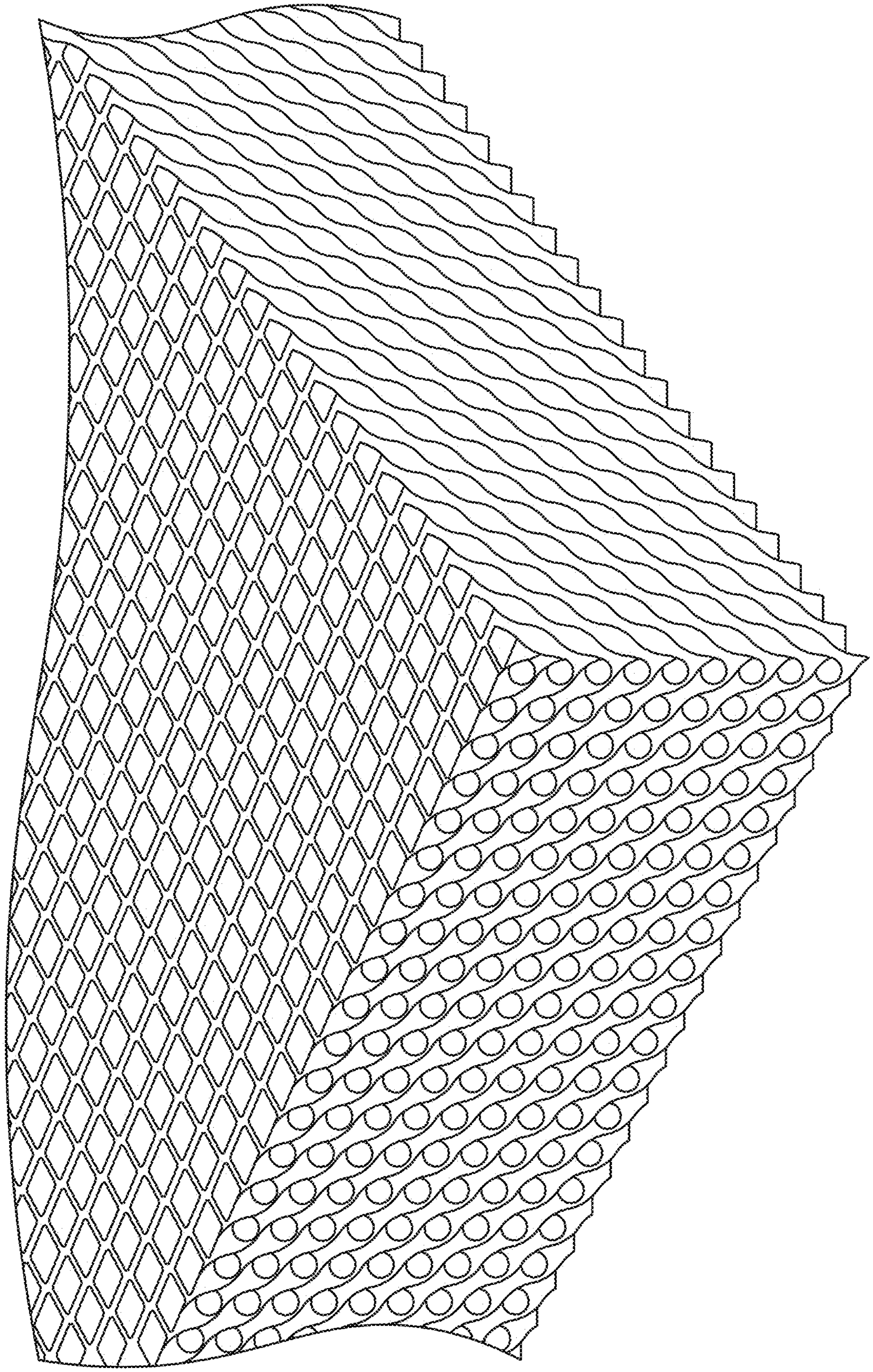
FIG. 5 is a perspective view of the matrix having a split pea TPMS structure, according to an embodiment of the present invention.

FIG. 3 is a perspective view of the matrix 110 having a gyroid TPMS structure, FIG. 4 is a perspective view of the matrix 110 having an orthogonal hole TPMS structure, and FIG. 5 is a perspective view of the matrix 110 having a split pea TPMS structure. It is noted however, that the TPMS structures depicted in FIGS. 1 through 5 are illustrative examples only and are not intended to be in any way limiting.

Figure 6:
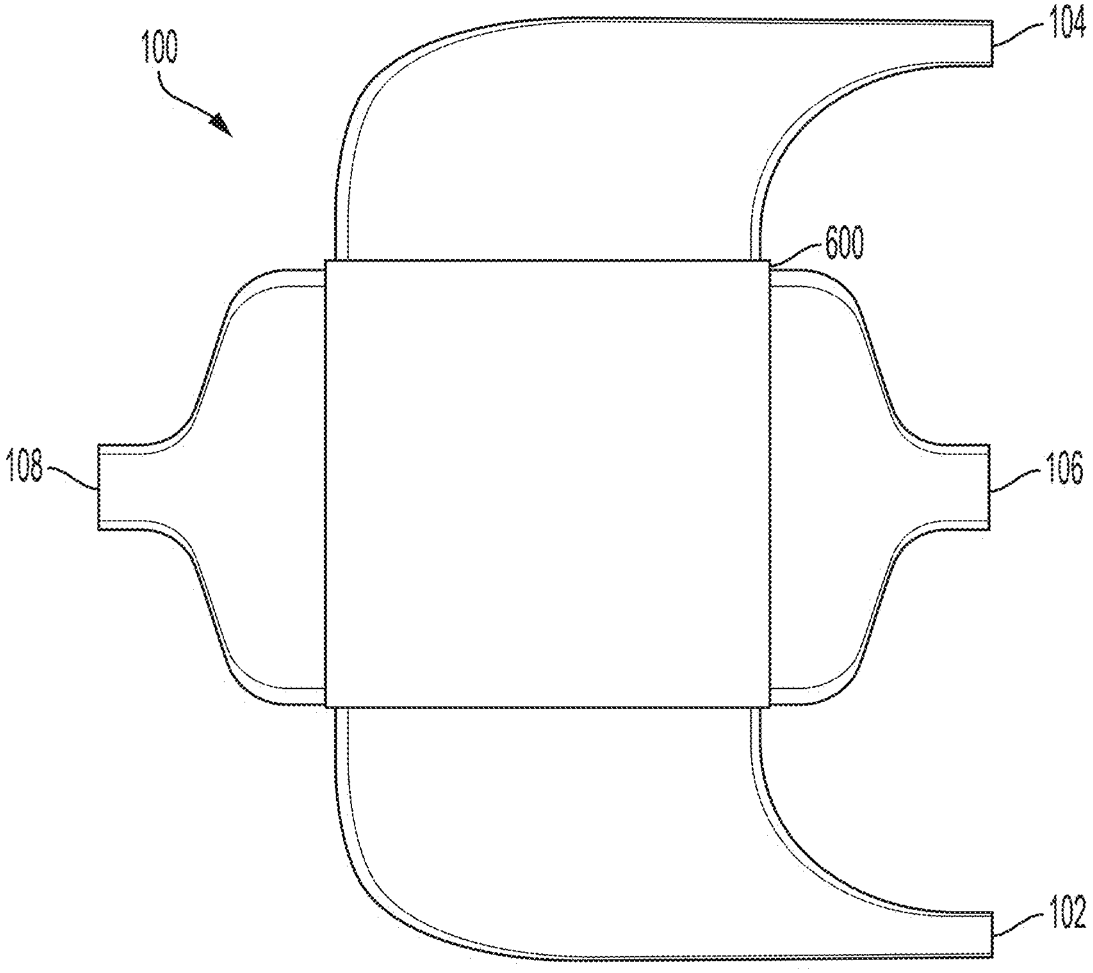
FIG. 6 is a top-down perspective view of the heat exchange cracking unit that utilizes a TPMS structure, according to an embodiment of the present invention.

FIG. 6 is a top-down perspective view of the heat exchange cracking unit 100 that utilizes a TPMS structure. In an embodiment, the heat exchange cracking unit 100 can be manufactured via welding the inlets 102, 106 and outlets 104, 108 to a housing 600. In an embodiment, the housing 600 can include a cover (not depicted in FIG. 6) which can be removed in order to service or replace the matrix 110. In another embodiment, the inlets 102, 106 and/or the outlets 104, 108 can be removably attached to the housing 600 so that different inlets and outlets having various dimensions, sizes, and flow properties can be utilized with the housing 600 in a modular fashion.

Figure 7:
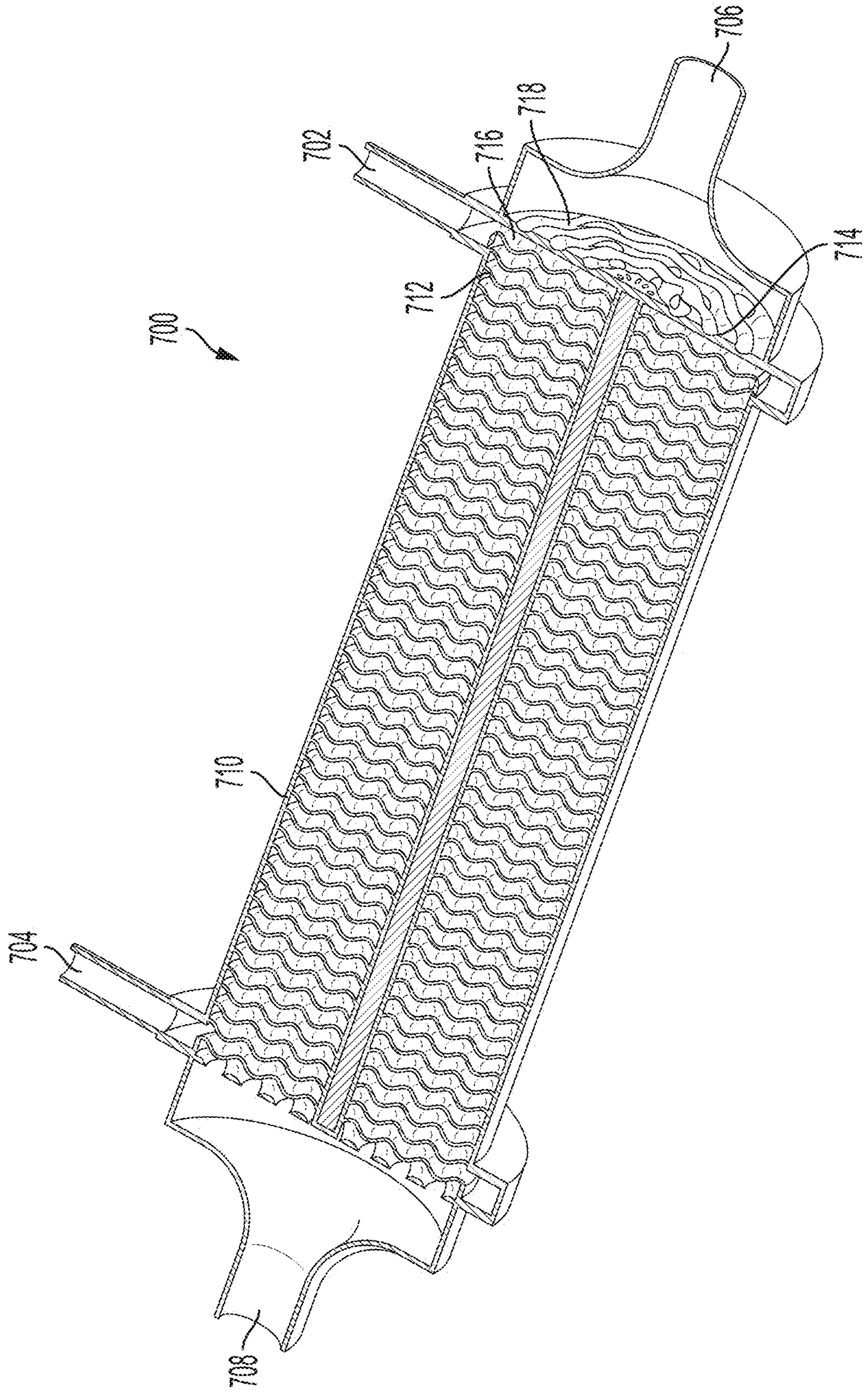
FIG. 7 is a front cross-sectional view of a cylindrical heat exchange cracking unit that utilizes a TPMS structure, according to an embodiment of the present invention.

FIG. 7 is a front cross-sectional view of a cylindrical heat exchange cracking unit 700 that utilizes a TPMS structure. Similar to the heat exchange cracking unit 100 shown in FIG. 1, the cylindrical heat exchange cracking unit 700 is metallic and made from a nickel alloy, and in a preferred embodiment, the cylindrical heat exchange cracking unit 700 is made from Inconel® 625.

In an embodiment, the cylindrical heat exchange cracking unit 700 includes an ammonia inlet 702, a hydrogen outlet 704, a heated exhaust gas inlet 706, and an exhaust gas outlet 708. Positioned between the inlets 702, 706 and outlets 704, 708 is a matrix 710. The matrix 710 is formed from width-wise surfaces 712 and length-wise surfaces 714 which run generally perpendicular to each other. The surfaces 712, 714 of the matrix 710 create passages allowing the gaseous ammonia and heated exhaust gas to flow; these passages are indicated by the ammonia channels 716 and heated exhaust gas channels 718.

Gaseous ammonia is supplied to cylindrical heat exchange cracking unit 700 via inlet 702, while heated exhaust gas is concurrently supplied to inlet 706. The gaseous ammonia traverses the matrix 710 axially, while the heated exhaust gas traverses the matrix laterally.

As shown in FIG. 7, the matrix 710 physically separates the gases passing through each of the channels 716, 718, thereby providing an exceptionally large surface area throughout the matrix 710 where the heated exhaust gas exchanges its heat with the gaseous ammonia. In an embodiment, the surfaces 712, 714 of the matrix 710 are coated with a catalyst that facilitates the cracking of ammonia into constituent hydrogen and nitrogen components. In this embodiment, the surfaces 712, 714 of the matrix 710 are coated with the catalyst using a washcoating or deposition technique to bind or adhere the catalyst to the surfaces 712, 714.

In another embodiment, catalyst in the form of discrete catalyst media is deposited into the passages forming the ammonia channels 716 and heated exhaust gas channels 718.

In yet another embodiment, the surfaces 712, 714 of the matrix 710 can be coated with a catalyst as described herein, and additional discrete catalyst media can be deposited into the passages forming the ammonia channels 716 and heated exhaust gas channels 718.

Figure 8:
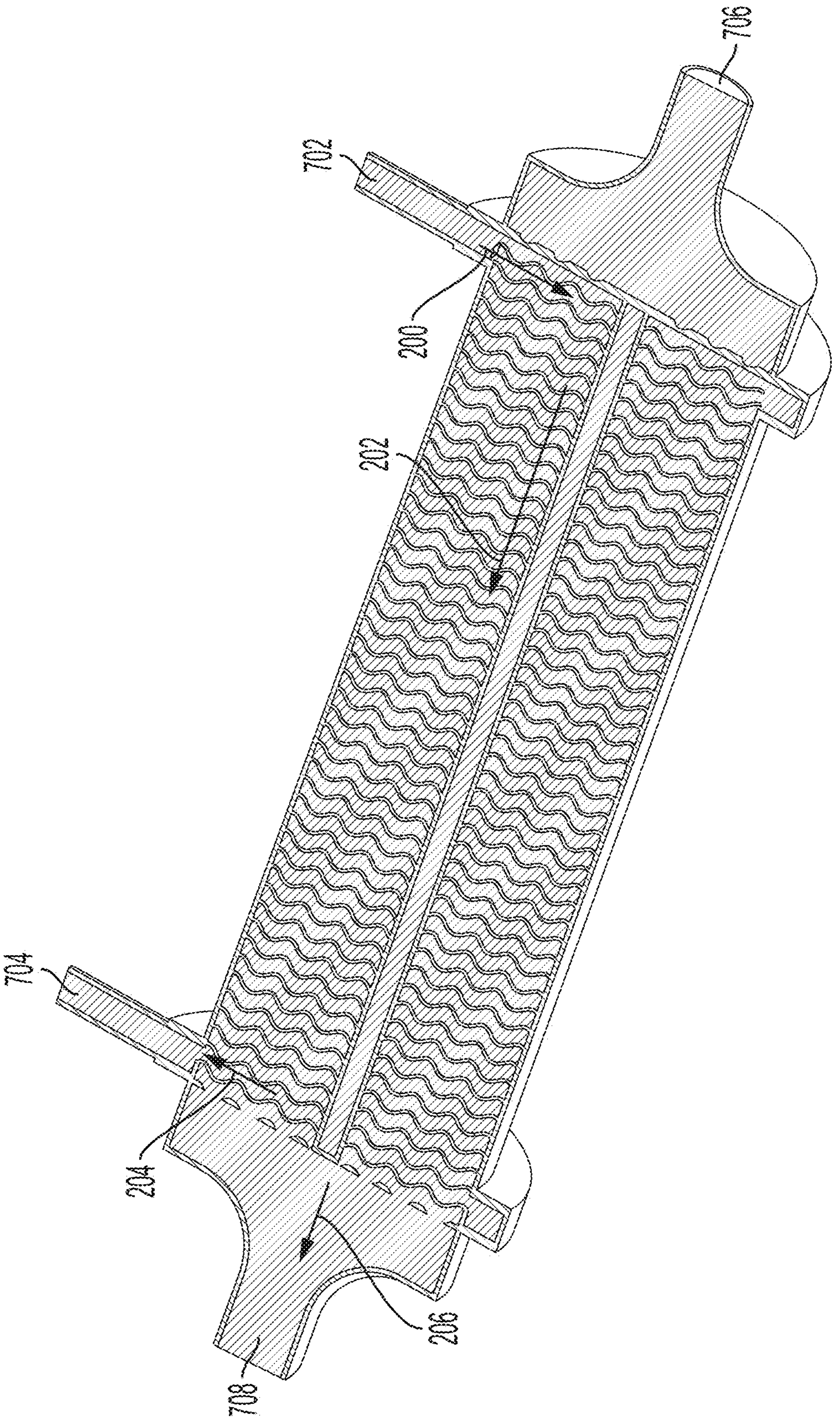
FIG. 8 is a front cross-sectional view of the cylindrical heat exchange cracking unit that utilizes a TPMS structure which depicts the flow of heated exhaust gas and gaseous ammonia through the matrix, according to an embodiment of the present invention.

FIG. 8 is a front cross-sectional view of the cylindrical heat exchange cracking unit 700 that utilizes a TPMS structure which depicts the flow of heated exhaust gas and gaseous ammonia through the matrix. In operation, gaseous ammonia 200 is supplied to the inlet 702 and flows through the ammonia channels 716, while heated exhaust gas 202 is concurrently supplied to the inlet 706 and flows through the heated gas channels 718. The heated exhaust gas 202 heats the catalyst, resulting in cracking of the ammonia 200 into constituent hydrogen and nitrogen components 204. The resulting hydrogen and nitrogen components 204 exit the heat exchange cracking unit 700 via the outlet 704 and are supplied to the downstream injection system for the engine, while residual exhaust gas 206 exits the heat exchange cracking unit via the outlet 708.

Figure 9:
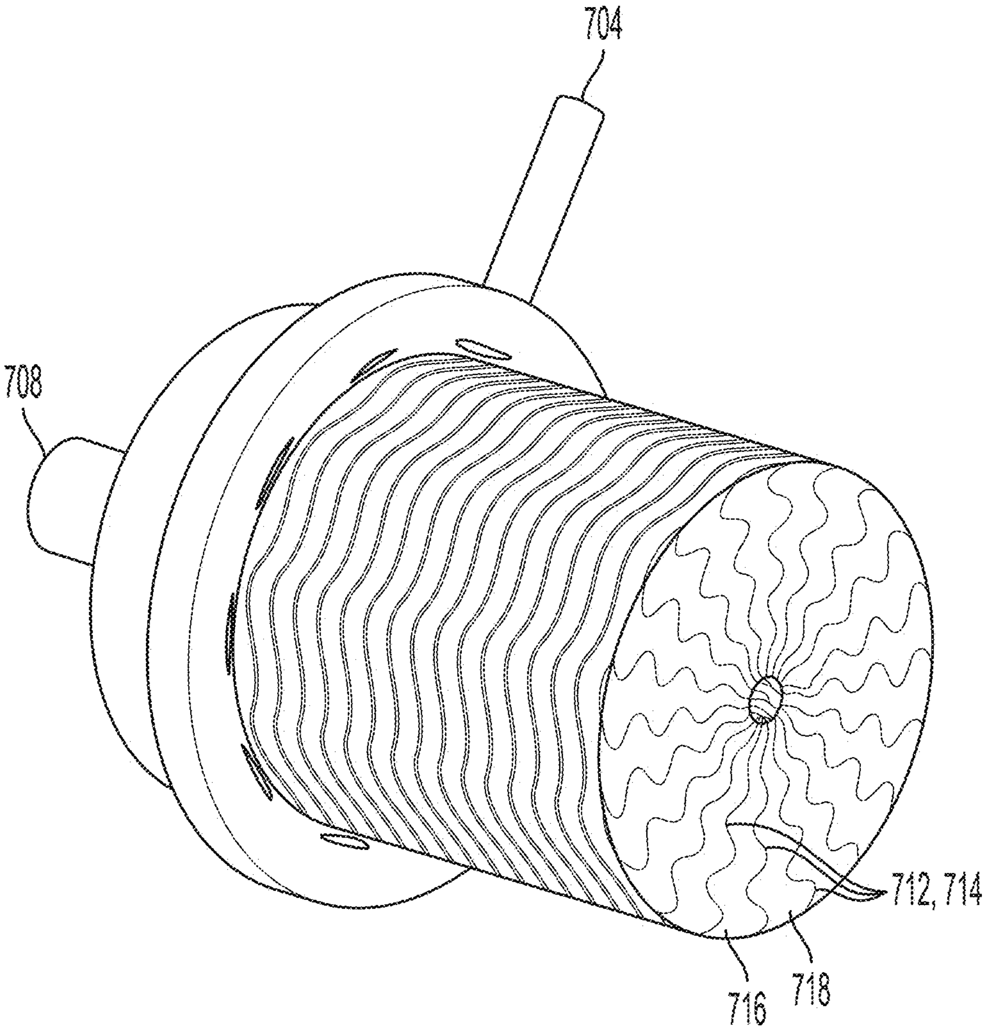
FIG. 9 is a side cross-sectional view of the cylindrical heat exchange cracking unit that utilizes a TPMS structure which depicts the flow of heated exhaust gas and gaseous ammonia through the matrix, according to an embodiment of the present invention.

FIG. 9 is a side cross-sectional view of the cylindrical heat exchange cracking unit 700 that utilizes a TPMS structure which depicts the flow of heated exhaust gas and gaseous ammonia through the matrix. As shown in FIG. 9, the surfaces 712, 714 of the matrix 710 creates ammonia channels 716 and heated exhaust gas channels 718. The cylindrical design can provide efficiencies for mass production, given the rounded parts, fewer welded seams/joints compared to square and rectangular designs, and less susceptibility to thermal stress.

It is noted that cylindrical shape of the cylindrical heat exchange cracking unit 700 is an illustrative example only and is not intended to be in any way limiting. In other embodiments, the heat exchange cracking unit 700 can be any polygonal shape, such as, for example, oval, oblong, triangular, square, kite-shaped, trapezoid, parallelogram, rhombus, and the like, as well as various 3D shapes such as, for example, cube, cuboid, sphere, cone, and the like.

Figure 10:
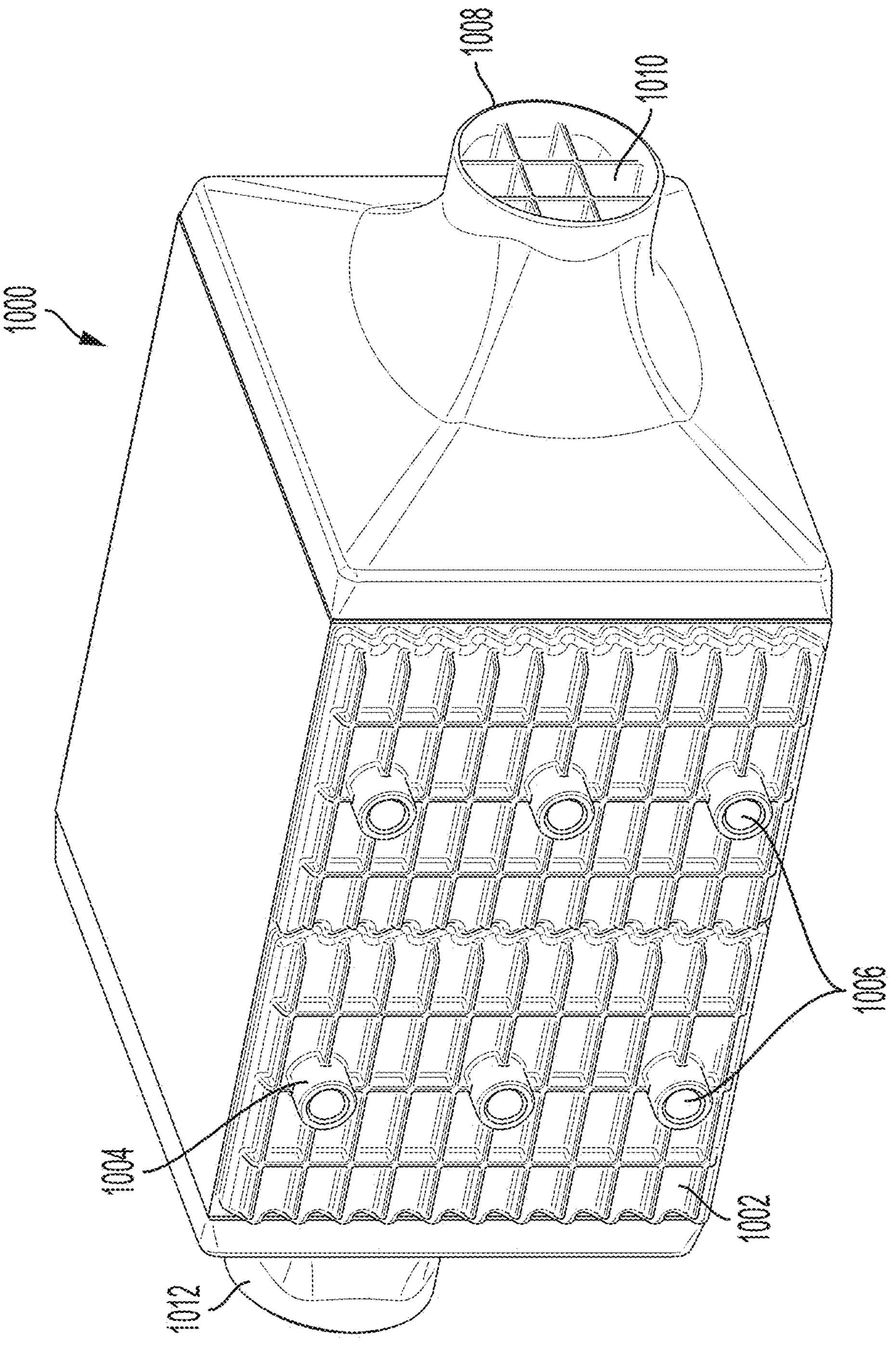
FIG. 10 is a perspective view of a heat exchange cracking unit that utilizes a tube bundle structure, according to an embodiment of the present invention.

FIG. 10 is a perspective view of a heat exchange cracking unit 1000 that utilizes a tube bundle structure, and which serves as a heat exchanger as well as a catalytic converter that performs ammonia cracking. The heat exchange cracking unit 1000 is metallic, and in an embodiment, includes a sidewall 1002 that includes a gaseous ammonia inlet 1004. In an embodiment, the inlet sidewall 1002 can include additional ports 1006 that may be used for a variety of functions. For example, the ports 1006 may serve an inlets, or may be coupled to equipment for temperature, throughput, and/or pressure sensing.

The heat exchange cracking unit 1000 further includes a heated gas inlet 1008. In an embodiment, the heated exhaust gas inlet 1008 includes a divider 1010 which spreads the heated exhaust gas from the engine evenly over the internal tube bundle structure contained within the heat exchange cracking unit 1000, as described in more detail with reference to FIG. 11. In an embodiment, the divider 1010 can have a grid or lattice structure.

The heat exchange cracking unit 1000 includes an exhaust gas outlet 1012 positioned opposite the heated gas inlet 1008.

Figure 11:
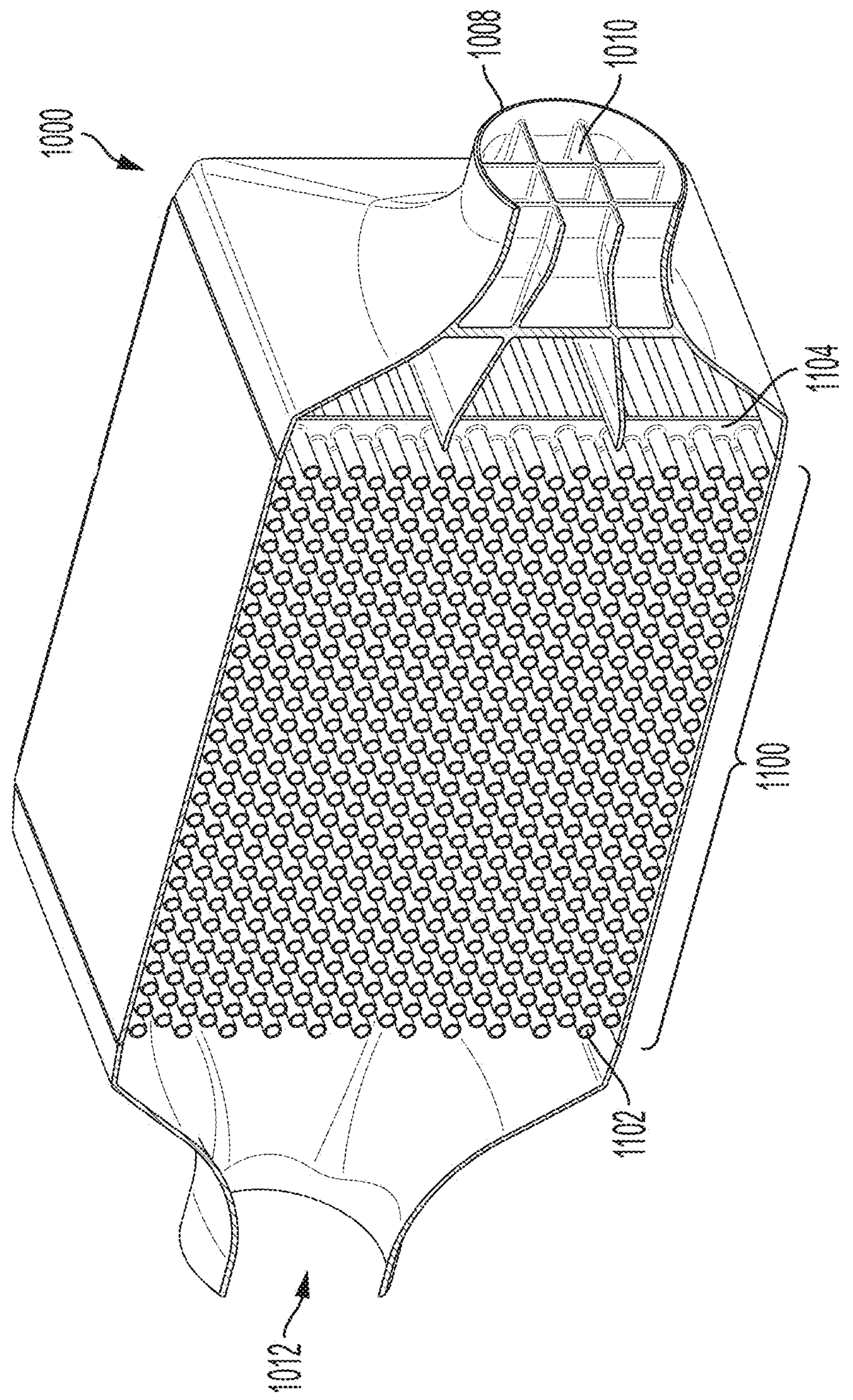
FIG. 11 is a front cross-sectional view of the heat exchange cracking unit that utilizes a tube bundle structure, according to an embodiment of the present invention.

FIG. 11 is a front cross-sectional view of the heat exchange cracking unit 1000 that utilizes a tube bundle structure. In an embodiment, a tube bundle structure 1100 is disposed within the heat exchange cracking unit 1000. The tube bundle structure 1100 is comprised of individual tubes 1102 which extend along the width of the heat exchange cracking unit 1000 from the sidewall 1002, perpendicular to the inlet 1008 and outlet 1012.

In an embodiment, the tube bundle structure 1100 includes rows and/or columns of tubes 1102 arranged in an offset fashion so that each adjacent row and/or column includes tubes which are offset from its neighboring tubes. This pattern maximizes the surface area contacted by the heated exhaust gas as the gas traverses the tube bundle structure 1100, thereby maximizing the amount of catalyst heated in order to facilitate the cracking process.

In an embodiment, the heat exchange cracking unit 1000 includes at least one support structure 1104 which facilitates the 3D printing process, and further provide stability against thermal stress during operation of the heat exchange cracking unit 1000.

Gaseous ammonia is supplied to the heat exchange cracking unit 1000 via inlet 1004, while heated exhaust gas concurrently is supplied to the inlet 1008. The gaseous ammonia traverses the lateral spaces between the tubes 1102, while the heated exhaust gas traverses the axial space inside the tubes 1102.

In an embodiment, the spaces between the tubes 1102 are filled with a catalyst in the form of a discrete catalyst media. In another embodiment, the tubes 1102 themselves are hollow and are also filled with the discrete catalyst media.

In yet another embodiment, the external surfaces and/or the internal surfaces of the tubes 1102 are also coated with the catalyst using a washcoating or deposition technique to bind or adhere the catalyst to the surfaces.

Figure 12:
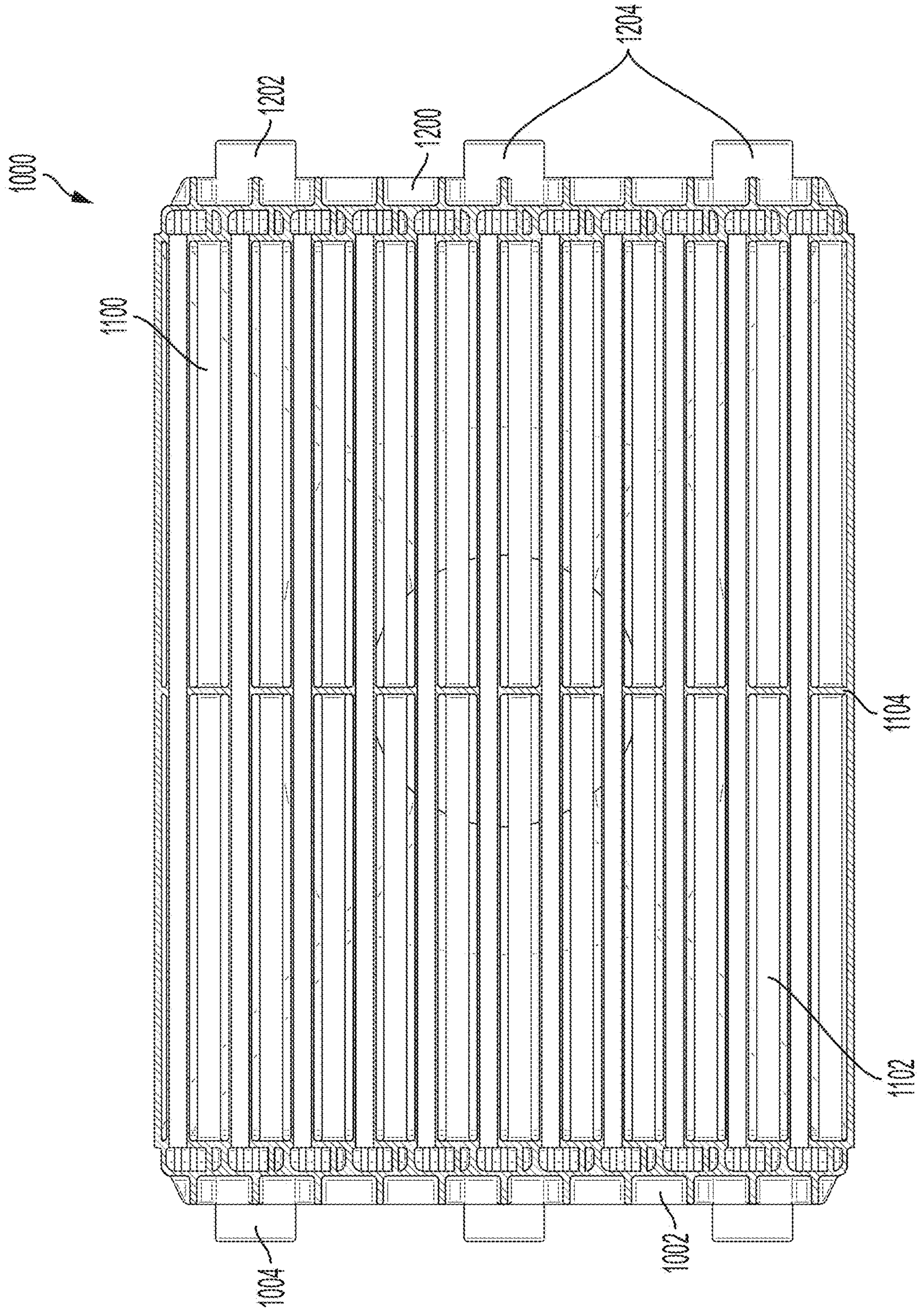
FIG. 12 is a side cross-sectional view of the heat exchange cracking unit that utilizes a tube bundle structure, according to an embodiment of the present invention.

FIG. 12 is a side cross-sectional view of the heat exchange cracking unit 1000 that utilizes a tube bundle structure 1100. In an embodiment, the heat exchange cracking unit 1000 includes a sidewall 1200 positioned opposite the sidewall 1002. The sidewall 1200 includes a hydrogen outlet 1202, and can include additional ports 1204 that may be used for a variety of functions. For example, the ports 1204 may serve as outlets, or may be coupled to equipment for temperature, throughput, and/or pressure sensing.

In operation, gaseous ammonia is supplied to the inlet 1004, while heated exhaust gas is concurrently supplied to the inlet 1008. The heated exhaust gas heats the catalyst, resulting in cracking of the ammonia into constituent hydrogen and nitrogen components. The resulting hydrogen and nitrogen components exit the heat exchange cracking unit 1000 via the outlet 1202 and are supplied to the downstream engine.

In an embodiment, the heat exchange cracking unit 1000 is made from a nickel alloy. In a preferred embodiment, the heat exchange cracking unit 1000 is made from Inconel® 625.

In an embodiment, the sidewalls 1002, 1200, the gaseous ammonia inlet 1004, the hydrogen outlet 1202, the heated exhaust gas inlet 1008, the divider 1010, the exhaust gas outlet 1012, and the support structures 1104 can be made from the same metallic material as the heat exchange cracking unit 1000. In another embodiment, the sidewalls 1002, 1200, the gaseous ammonia inlet 1004, the divider 1010, the hydrogen outlet 1202, the heated exhaust gas inlet 1008, and the exhaust gas outlet 1012 can be made from stainless steel, silver, bronze, and comparable alloys.

In an embodiment, the heat exchange cracking unit 1000 includes a plate heat exchanger. The plate heat exchanger consists of a series of parallel metallic plates that are placed adjacent to one another, thereby forming a series of channels for the respective fluids (i.e., gaseous ammonia and heated exhaust gas) to flow between the plates. The space between two adjacent plates forms a channel in which a respective fluid flows. Heat transfer occurs when the gaseous ammonia flows in one channel, and heated exhaust flows in an adjacent channel, where a common metallic plate separates the two adjacent channels.

Inlet and outlet holes on each of the metallic plates allow the gaseous ammonia and heated exhaust gas to flow through respective adjacent channels, such that a metallic plate is always in contact on one side with gaseous ammonia, and on the other side with heated exhaust gas.

A plate heat exchanger is advantageous as it allows the gaseous ammonia and heated exhaust gas to be spread across multiple plates, thereby exposing the fluids to a large heat transfer surface area.

In an embodiment, the plate heat exchanger utilizes counter-current flow, where the gaseous ammonia flows in one direction in its respective channel, and heated exhaust gas flows in an opposite direction in its respective adjacent channel.

In another embodiment, the plate heat exchanger utilizes parallel flow, where the gaseous ammonia and heated exhaust gas each flow in the same direction in their respective adjacent channels.

In an embodiment, the surfaces of the metallic plates can be corrugated in order to increase the turbulence in the gaseous ammonia and heated exhaust gas as these fluids flow through the plate heat exchanger. This turbulence provides an effective heat transfer coefficient.

In an embodiment, the surfaces of the metallic plates are coated with a catalyst. In another embodiment, the channels where the gaseous ammonia flows are filled with a catalyst, such as discrete catalyst media. In yet another embodiment, the channels where gaseous ammonia flows are filled with a catalyst, and the surfaces of the metallic plates facing these channels where gaseous ammonia flows are also coated with a catalyst.

Figure 13:
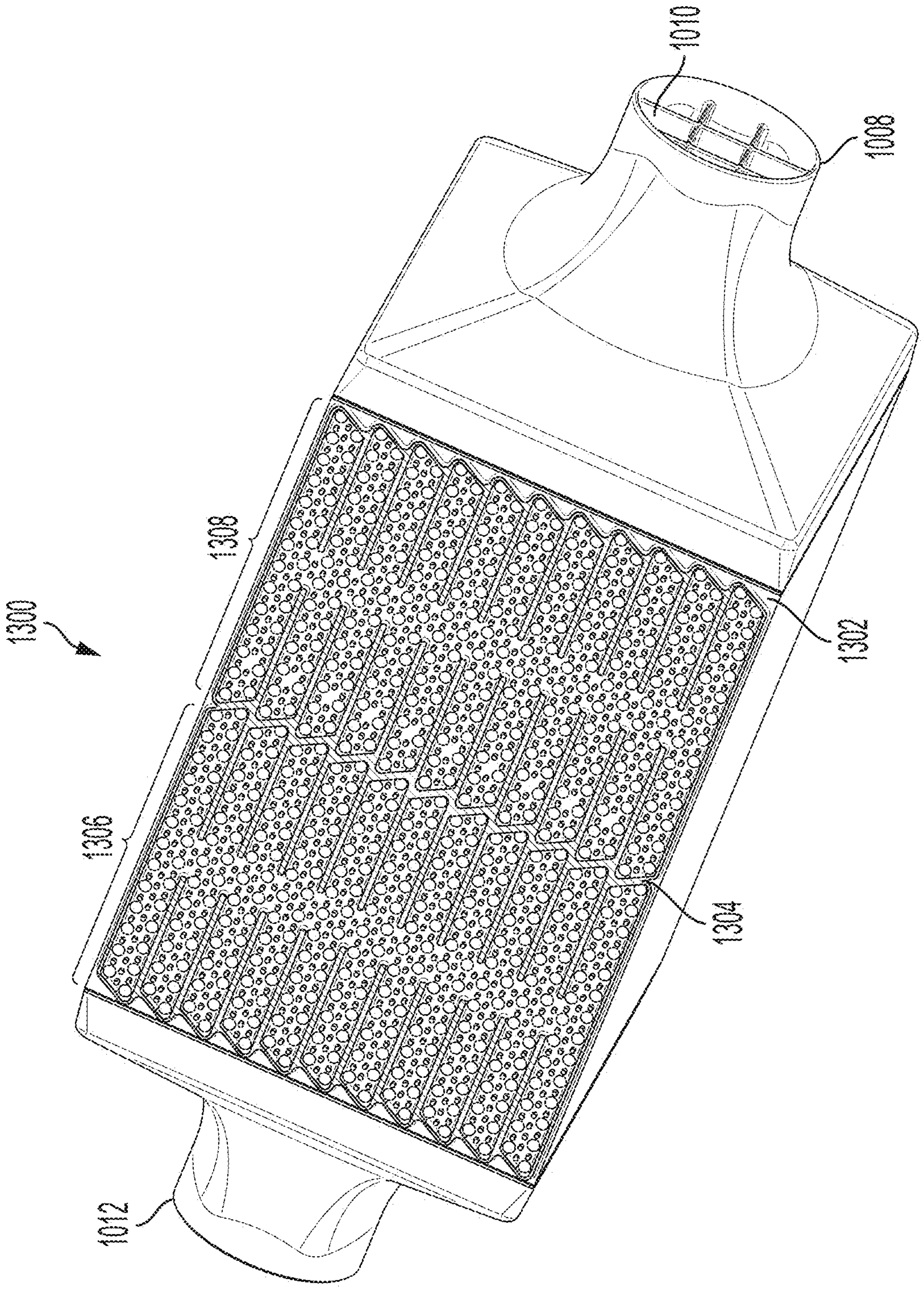
FIG. 13 is a front cross-sectional view of a two-pass heat exchange cracking unit that utilizes a tube bundle structure, according to an embodiment of the present invention.

FIG. 13 is a front cross-sectional view of a two-pass heat exchange cracking unit 1300 that utilizes a tube bundle structure 1100. In this embodiment, the support structure 1302 includes a fascia that receives a sidewall (not depicted in FIG. 13). The support structure 1302 includes a divider 1304 which physically separates the tube bundle structure 1100 into a left section 1306 and right section 1308. The divider 1304 extends along the width of the two-pass heat exchange cracking unit 1300 between the two sidewalls. In this embodiment, a gaseous ammonia inlet is positioned on a sidewall covering the left section 1306, and a hydrogen outlet is positioned on a sidewall covering the right section 1308.

In operation, gaseous ammonia is supplied to the gaseous ammonia inlet, while heated exhaust gas is concurrently supplied to the inlet 1008. As the ammonia traverses the left section 1306 of tube bundle structure 1100, heated exhaust gas heats the catalyst, resulting in cracking of the ammonia into constituent hydrogen and nitrogen components. The remaining ammonia traverses back through the right section 1308 of the tube bundle structure 1100 and continues to undergo cracking, thereby providing a two-pass cracking process. The resulting hydrogen and nitrogen components exit the two-pass heat exchange cracking unit 1300 via the hydrogen outlet and are supplied to the downstream engine.

Figure 14:
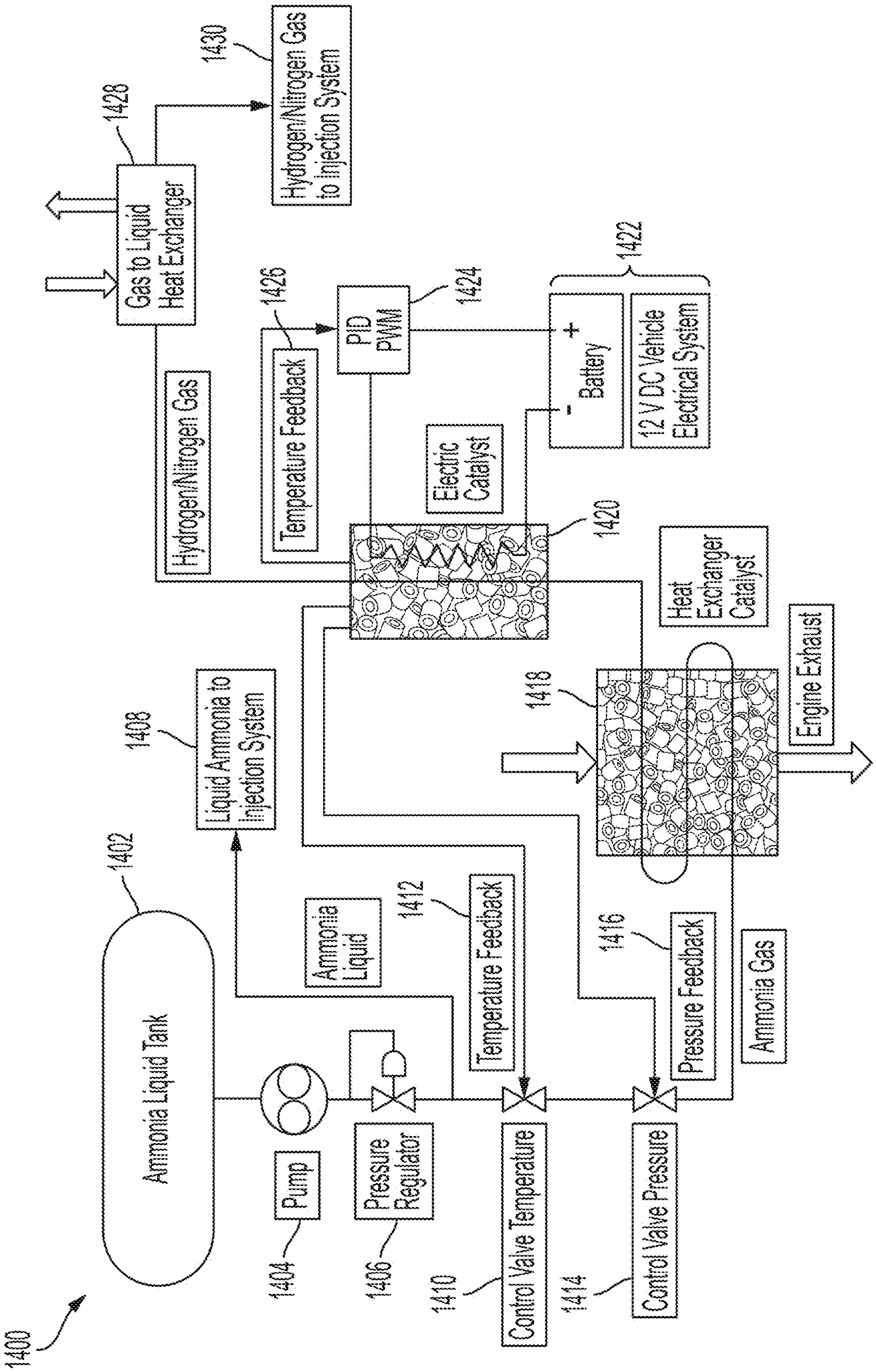
FIG. 14 is a block diagram of an on-board ammonia cracking system for an internal combustion engine, according to an embodiment of the present invention.

FIG. 14 is a block diagram of an on-board ammonia cracking system for an internal combustion engine. The on-board ammonia cracking system 1400 provides a mechanism to generate hydrogen from ammonia which eliminates the need for a separate hydrogen tank to be carried by the motor vehicle.

Referring FIG. 14, an ammonia liquid tank 1402 is mounted to a motor vehicle or engine, and in an embodiment, the ammonia liquid tank 1402 can be coupled to a pump 1404. In an embodiment, the tank 1402 is refillable and/or replaceable. The pump 1404 can be coupled to a port on the tank 1402 to facilitate the delivery of ammonia from the tank 1402. For example, in a cold environment where the temperature is approximately 0° C. or less, the vapor pressure of ammonia is not adequate to push itself out of the tank 1402. Thus, the pump 1404 is required to draw or force the ammonia out of the tank 1402.

In another embodiment, an electrical heater (not depicted in FIG. 14) can be coupled to the tank 1402, such as within the tank 1402 or on an outer surface of the tank 1402, in order to heat the liquid ammonia contained within the tank 1402 to a temperature where it vaporizes into a gaseous form.

In an embodiment, a pressure regulator 1406 is coupled to an outlet of the tank 1402, and serves to control the volume and/or flow rate of ammonia drawn out of the tank 1402 by the pump 1404. The pressure regulator 1406 monitors the pressure of the liquid ammonia in the tank 1402. Once the pressure lowers to a threshold pressure value whereby the liquid ammonia can vaporize into a gaseous form, the pressure regulator 1406 opens and feeds gaseous ammonia downstream. Any residual liquid ammonia that passes through the pressure regulator 1406 is fed to an injection system 1408 (via, for example, a T-coupling on a supply line).

In an embodiment, a temperature control valve 1410 receives a temperature feedback signal 1412 that contains a temperature reading from an electric cracking unit 1420 during a cold start of the engine. The temperature feedback signal 1412 can be generated by a temperature sensor coupled to the electric cracking unit 1420. Once the electric cracking unit 1420 reaches a threshold temperature (i.e., the temperature reading is equal to or greater than the threshold temperature) suitable to perform the ammonia cracking process, the temperature control valve 1410 opens and the gaseous ammonia passes through the heat exchange cracking unit 1418, and travels downstream to the electric cracking unit 1420, which is heated using power supplied from the vehicle power system 1422.

If the electric cracking unit 1420 has not reached the threshold temperature, then the temperature control valve 1410 continues to monitor the temperature feedback signal 1412, and prevents the downstream travel of the gaseous ammonia. The cold start operation is described in more detail herein.

In an embodiment, the temperature of the heated exhaust gas entering the heat exchange cracking unit 1418 is judged based on the current draw in the electric cracking unit 1420, where the current draw is indicative of how effective the heat exchange cracking unit 1418 is in cracking the gaseous ammonia.

For example, if there is hydrogen and nitrogen passing from the heat exchange cracking unit 1418 to the electric cracking unit 1420, the electric cracking unit 1420 will not perform the ammonia cracking process, and thus will draw minimal or no current.

If, however, gaseous ammonia passes from the heat exchange cracking unit 1418 to electric cracking unit 1420, the ammonia cracking process will occur, drawing current in order to heat the heating element disposed within the electric cracking unit 1420.

However, during a normal or high load operating conditions of the engine (i.e., not during a cold start or low load operating conditions), the on-board ammonia cracking system 1400 does not utilize the electric cracking unit 1420 to perform the ammonia cracking process, and the heat exchange cracking unit 1418 performs the ammonia cracking process as it will have been heated to the threshold temperature by the heated exhaust gas from the engine.

The heat exchange cracking unit 1418 referred to in FIG. 14 can be any of the embodiments described herein—the heat exchange cracking unit 100 that utilizes a TPMS structure, the cylindrical heat exchange cracking unit 700 that utilizes a TPMS structure, the heat exchange cracking unit 1000 that utilizes a tube bundle structure, or the two-pass heat exchange cracking unit 1300 that utilizes a tube bundle structure.

The pressure control valve 1414 is located in series with the temperature control valve 1410, and controls the amount of gaseous ammonia which is fed into the heat exchange cracking unit 1418.

In an embodiment, the pressure control valve 1414 receives a pressure feedback signal 1416 from the heat exchange cracking unit 1418. For example, the heat exchange cracking unit 1418 can be coupled to a pressure transducer or the like (not depicted in FIG. 14) that generates the pressure feedback signal 1416.

In an embodiment, to facilitate a cold start of the on-board ammonia cracking system 1400 when the exhaust gas from the engine is not at a threshold temperature suitable to perform the ammonia cracking process, the electric cracking unit 1420 is used to heat the catalyst so that the gaseous ammonia can be cracked, and the resulting hydrogen is to be supplied to the downstream injection system for the engine. The engine can then burn the hydrogen, powering the engine which results in heated exhaust gas being supplied to the on-board ammonia cracking system 1400.

In an embodiment, the electric cracking unit 1420 is coupled to the vehicle power system 1422, such as a traditional vehicle battery. In another embodiment, the electric cracking unit 1420 can be heated via a supplemental heating/electric source, such as a renewable energy source, a portable battery source, an on-board electric battery pack, and/or a rechargeable battery.

In addition to facilitating a cold start of the on-board ammonia cracking system 1400, the electric cracking unit 1420 is utilized to supplement the heat exchange cracking unit 1418 during low load operating conditions of the engine, such as when the vehicle is stopped, moving slowly, or idling. For example, during low load operating conditions, the engine exhaust gas temperature can drop significantly. The reduced temperature of the exhaust gas flowing into the heat exchange cracking unit 1418 during such low load operating conditions may not be sufficient for the catalyst to crack the ammonia. In an embodiment, depending on the specific catalyst that is utilized, the temperature of the exhaust gas needs to be at least 400° C. to 700° C. in order to perform the ammonia cracking process, and in a preferred embodiment, the temperature of the exhaust gas is at least 600° C. in order to perform the ammonia cracking process.

In this scenario, the cold gaseous ammonia will pass through the heat exchange cracking unit 1418, and will be supplied downstream to the electric cracking unit 1420, which is heated using power supplied from the vehicle power system 1422. Once the electric cracking unit 1420 is heated to a threshold temperature suitable to perform the ammonia cracking process, the temperature control valve 1410 opens and allows the gaseous ammonia to be fed to the heat exchange cracking unit 1418 and ultimately to the electric cracking unit 1420. The electric cracking unit 1420 then performs the ammonia cracking process, and the resulting hydrogen is supplied to the downstream injection system for the engine.

When the exhaust gas flowing into the heat exchange cracking unit 1418 reaches a threshold temperature suitable to perform the ammonia cracking process, such as during normal or high load operating conditions of the engine, the ammonia cracking process occurs within the heat exchange cracking unit 1418. The resulting hydrogen and nitrogen will pass downstream through the electric cracking unit 1420, and further downstream to a gas-to-liquid or gas-to-gas heat exchange unit 1428, and subsequently to the injection system 1430 for the engine. In an embodiment, the gas-to-liquid or gas-to-gas heat exchange unit 1428 may leverage engine coolant and/or the engine radiator, or input ammonia gas or liquid, to facilitate the heat exchange process.

In an embodiment, the pressure regulator 1406 can be controlled with an electric servomotor to provide a steady flow of gaseous ammonia from the tank 1402. In another embodiment, a pulse-width modulated injection valve can be used. The servomotor and/or pulse generators can be controlled using an electronic controller, such as an industrial PID controller (not depicted in FIG. 14).

In an embodiment, the electronic controller can be coupled to various components of the on-board ammonia cracking system 1400 to receive inputs from the pressure regulator 1406, the temperature control valve 1410, pressure control valve 1414, as well as from sensors such as temperature sensors and pressure transducers which may be coupled to the exhaust gas cracking unit 1418 and/or electric cracking unit 1420.

In another embodiment, the electronic controller can be integrated into the hardware and software with the vehicle's electronic control unit (ECU). In this embodiment, the flow rate of hydrogen fed to the injection system of the engine can be measured and reported back to the ECU as a mechanism to control the injection strategy.

Figure 15:
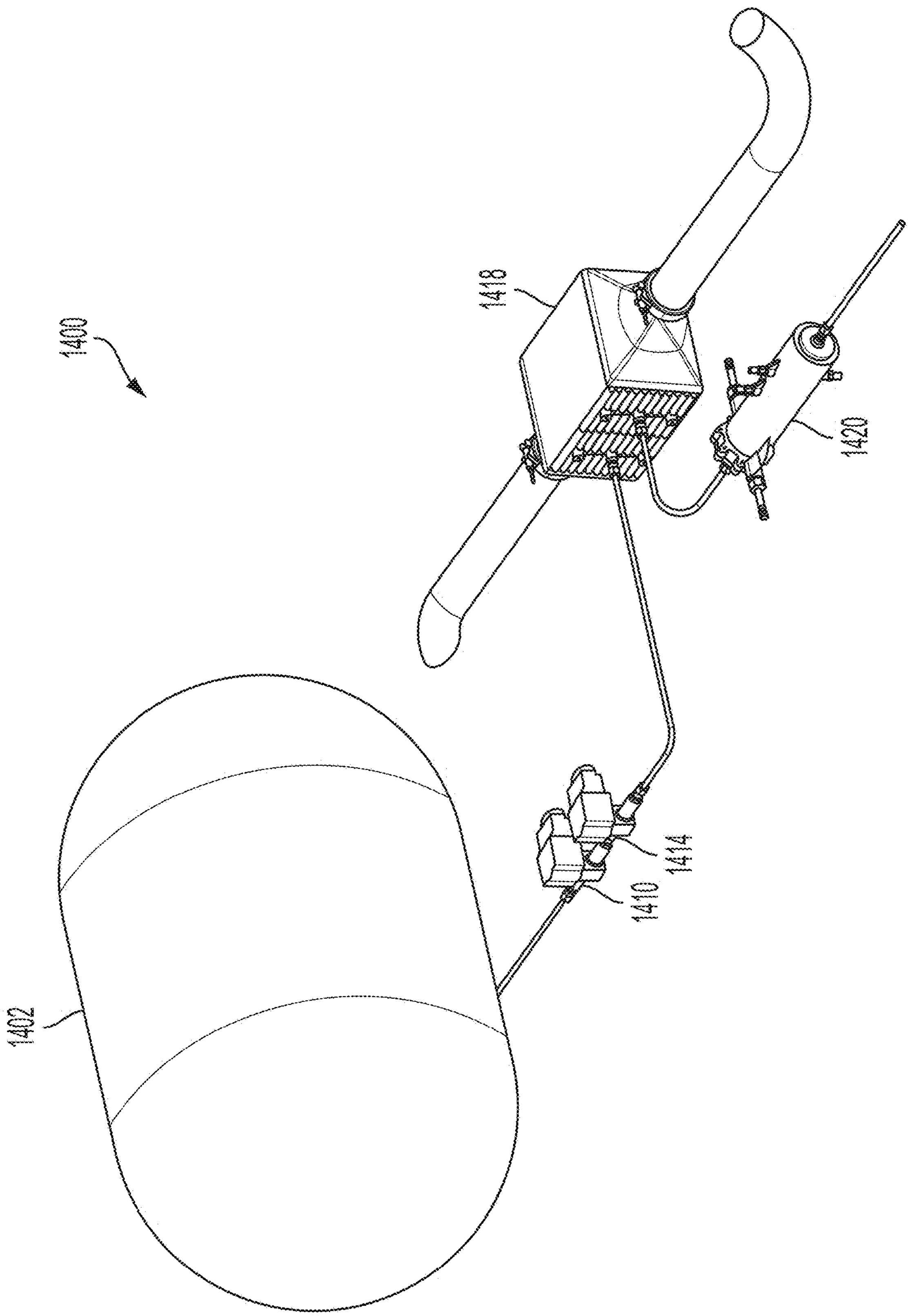
FIG. 15 is a perspective view of an on-board ammonia cracking system for an internal combustion engine, according to an embodiment of the present invention.
Figure 16:
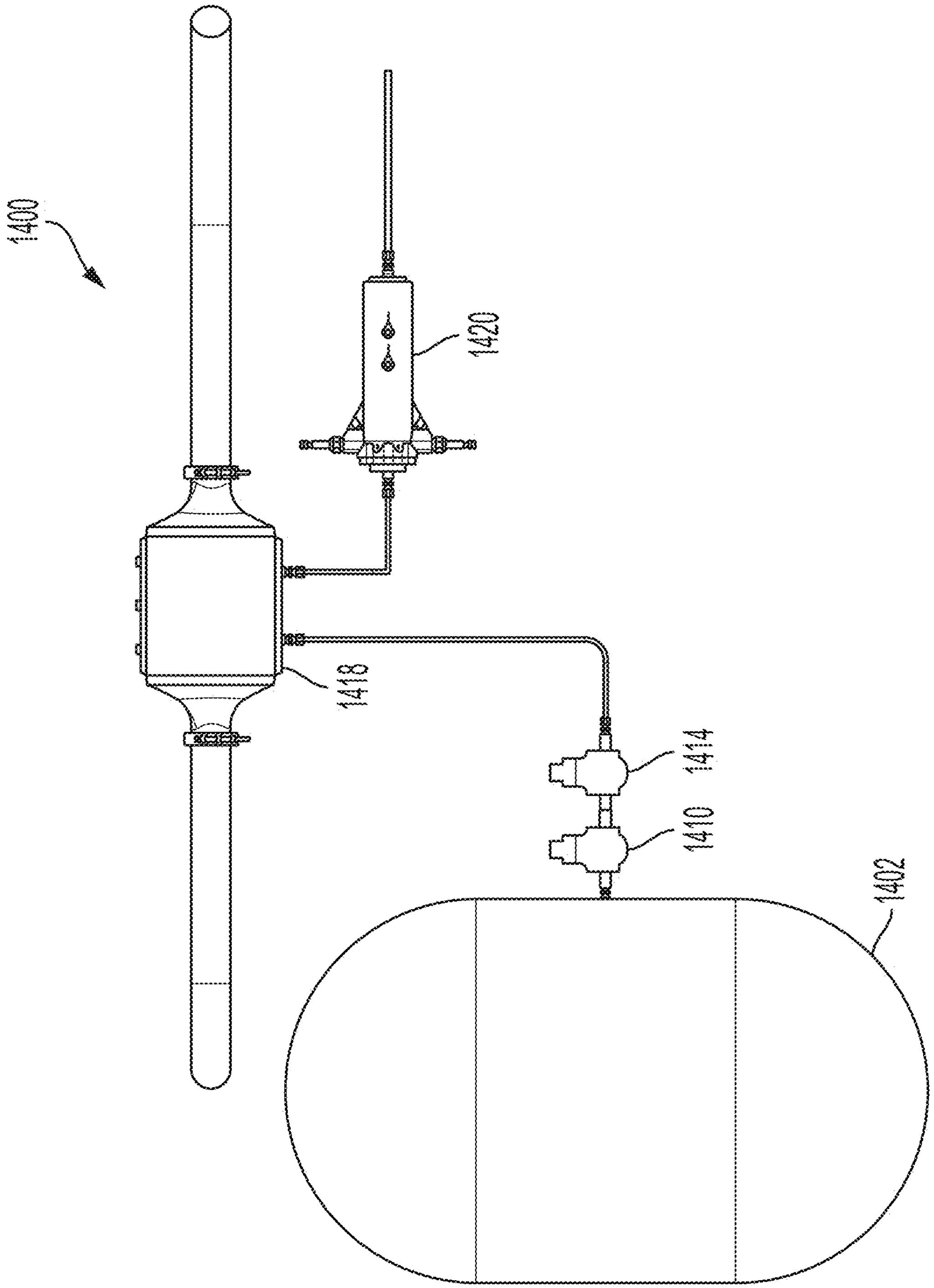
FIG. 16 is a top-down perspective view of the on-board ammonia cracking system, according to an embodiment of the present invention.
Figure 17:
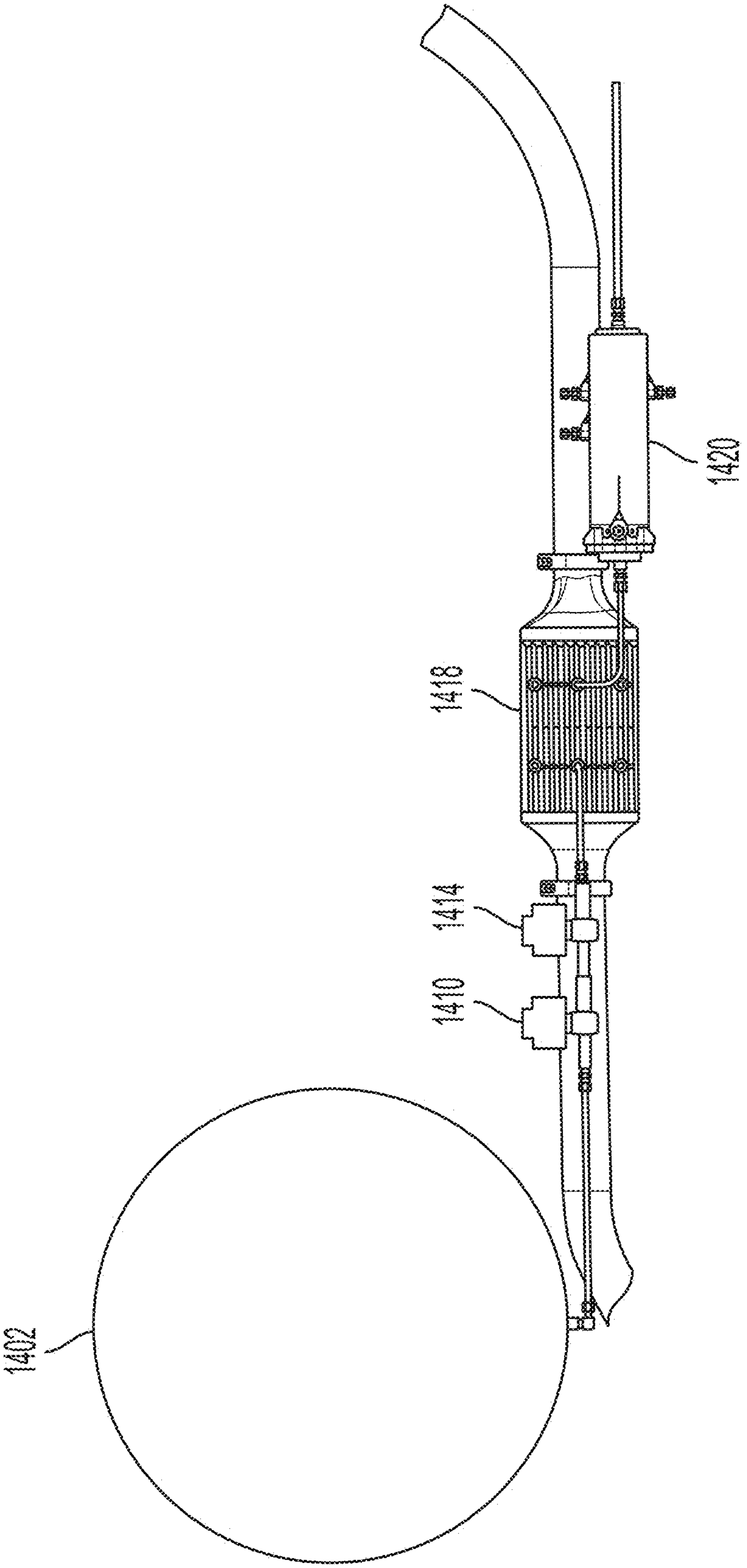
FIG. 17 is a perspective side view of the on-board ammonia cracking system, according to an embodiment of the present invention.

FIGS. 15-17 are various perspective views of the on-board ammonia cracking system 1400 for an internal combustion engine described in FIG. 14.

Figure 18:
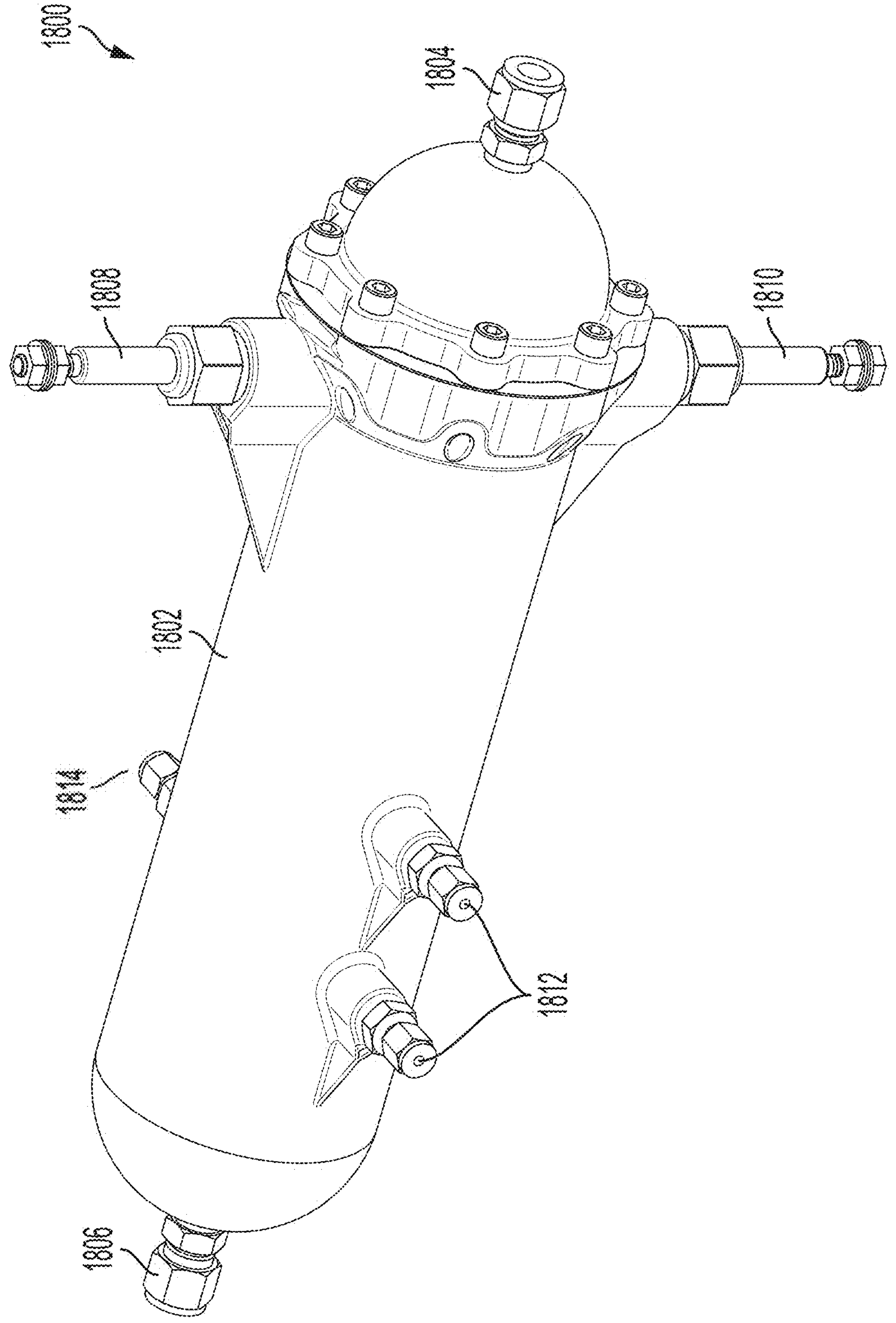
FIG. 18 is a perspective view of an electric cracking unit, according to an embodiment of the present invention.

FIG. 18 is a perspective view of an electric cracking unit. In an embodiment, the electric cracking unit 1800 comprises a housing 1802 which encloses a ceramic tube 1900 (depicted in FIG. 19). In an embodiment, the housing 1802 is a metal housing.

In an embodiment, the electric cracking unit 1800 includes a gaseous ammonia inlet 1804 and a hydrogen outlet 1806 disposed on the opposite end of the electric cracking unit 1800. The electric cracking unit further includes power feed-throughs 1808, 1810 for the heating element 1904 (depicted in FIG. 19). In an embodiment, the electric cracking unit 1800 can include radial fittings 1812, 1814 that may be used for a variety of functions. For example, the radial fittings 1812, 1814 may serve an inlets, outlets, or may be coupled to equipment for temperature, throughput, and/or pressure sensing. In an embodiment, the radial fittings 1812 can each include, or be coupled to, thermocouples, and the radial fitting 1814 can include, or be coupled to, a pressure transducer.

Figure 19:
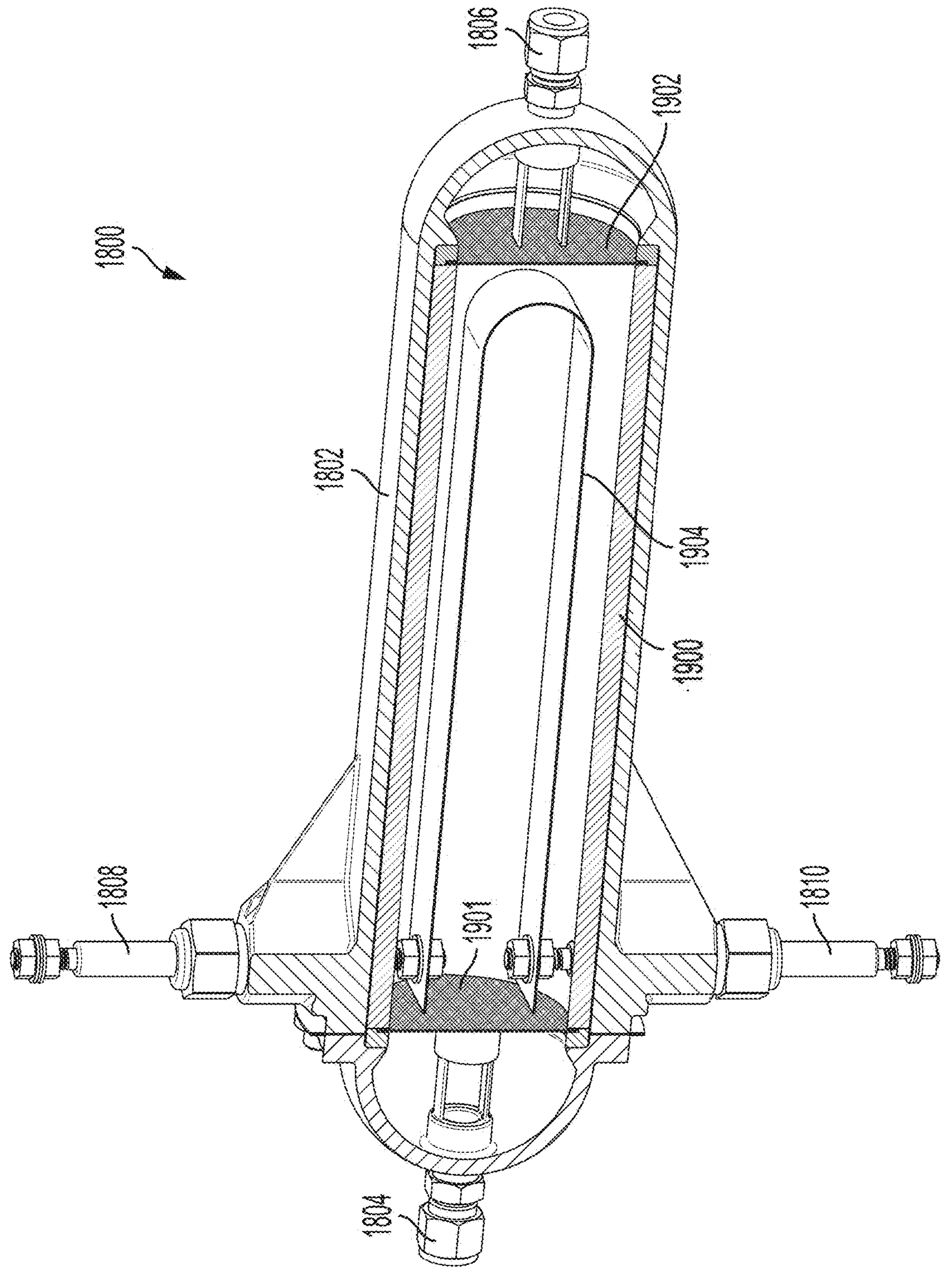
FIG. 19 is a cross-sectional view of an electric cracking unit, according to an embodiment of the present invention.

FIG. 19 is a cross-sectional view of the electric cracking unit 1800. In an embodiment, a ceramic tube 1900 houses a catalyst. The ceramic tube 1900 acts as an insulator, and allows heat to be focused and reflected toward the catalyst, thereby heating the catalyst.

In an embodiment, a first screen 1901 and second screen 1902 are disposed at opposite ends within the ceramic tube 1900. The screens 1901, 1902 can be made from wire, a wire mesh, or another metallic mesh or matrix structure. In an embodiment, the screens 1901, 1902 can be made from a nickel alloy that is resistant to heated hydrogen gas that is generated from the cracking of ammonia, as well as resistant to the gaseous ammonia itself.

In an embodiment, a heating element 1904 is also disposed within the ceramic tube 1900. Electrical current is passed through the heating element 1904 in order to heat the heating element 1904 to a threshold temperature suitable to perform the ammonia cracking process. In an embodiment, the heating element 1904 and screens 1901, 1902 are made from a nickel alloy, or other material(s) resistant to hydrogen and ammonia, as nickel maintains a fairly constant resistance with high temperatures, as opposed to steel which has a lower resistance at high temperatures. Further, nickel alloys may have a higher resistance to corrosion during exposure to ammonia and hydrogen at high temperatures (which may be realized within the electric cracking unit 1800, such as, for example, temperatures in excess of 600° C.).

In a preferred embodiment, the heating element 1904 and the screens 1901, 1902 are made from Inconel® 625. In an embodiment, the heating element 1904 and the screens 1901, 1902 can be made from the same material. Alternatively, the heating element 1904 and the screens 1901, 1902 can be made from different materials.

In an embodiment, the heating element 1904 can be an air process heater, a cartridge heater, a tubular heater, a band heater, a strip heater, an etched foil heater (or a thin-film heater), a ceramic heater, a ceramic fiber heater, a resistance wire, and the like.

In an embodiment, respective ends of the heating element 1904 are in contact with the power feed-throughs 1808, 1810. The power feed-throughs 1808, 1810 provide electricity for energizing or heating the heating element 1904.

In an embodiment, the heating element 1904 is regulated via an electronic controller coupled to the power feed-throughs 1808, 1810 by utilizing readings from the thermocouples coupled to the radial fittings 1812, so that the heating element 1904 maintains a threshold temperature suitable to perform the ammonia cracking process. The threshold temperature can range from 400° C. to 700° C., and in a preferred embodiment, the threshold temperature is at least 600° C.

In an embodiment, the electronic controller can be used to control an electric expansion valve (not depicted in FIG. 19) that is coupled to the inlet 1804 by utilizing readings from the pressure transducer coupled to radial fitting 1814 and/or the thermocouples coupled to radial fittings 1812. Once the gaseous ammonia received by the electric cracking unit 1800 from the heat exchange cracking unit has reached the threshold temperature, the electric expansion valve is utilized to maintain the vapor pressure of the gaseous ammonia. At these threshold temperature and pressure values, the electric expansion valve is opened, allowing the ammonia to enter the ceramic tube 1900.

In an embodiment, catalyst, such as discrete catalyst media, is deposited into the ceramic tube. The gaseous ammonia undergoes a chemical reaction with the catalyst disposed within the ceramic tube 1900, and the resulting hydrogen and nitrogen components exit the electric cracking unit 1800 via the outlet 1806 and are supplied to the downstream injection system for the engine.

In another embodiment, the heating element 1904 is coated with a catalyst that facilitates the ammonia cracking process, and discrete catalyst is not disposed within the ceramic tube 1900. In this embodiment, the catalyst is coated to the heating element 1904 using a washcoating or deposition technique to bind or adhere the catalyst to the surfaces of the heating element 1904.

In one embodiment, the heating element 1904 is a strip heater. The heating element 1904 can be coated on all surfaces with the catalyst, or alternatively, a catalyst sleeve can be placed over the strip heating element 1904. In an embodiment, the strip heating element 1904 can have a relatively low heat transfer efficiency so as to maintain a high skin (or boundary layer) temperature of the catalyst that externally coats the strip heating element 1904.

In another embodiment, the heating element 1904 is a spiral heater, a coil heater, or an air process heater, where the internal walls (which contain integral heating elements) are coated with the catalyst.

In yet another embodiment, the catalyst is coated on the interior wall(s) of the ceramic tube 1900. In this embodiment, the catalyst is coated to the interior wall(s) of the ceramic tube 1900 using a washcoating or deposition technique to bind or adhere the catalyst to the wall surfaces.

Figure 20:
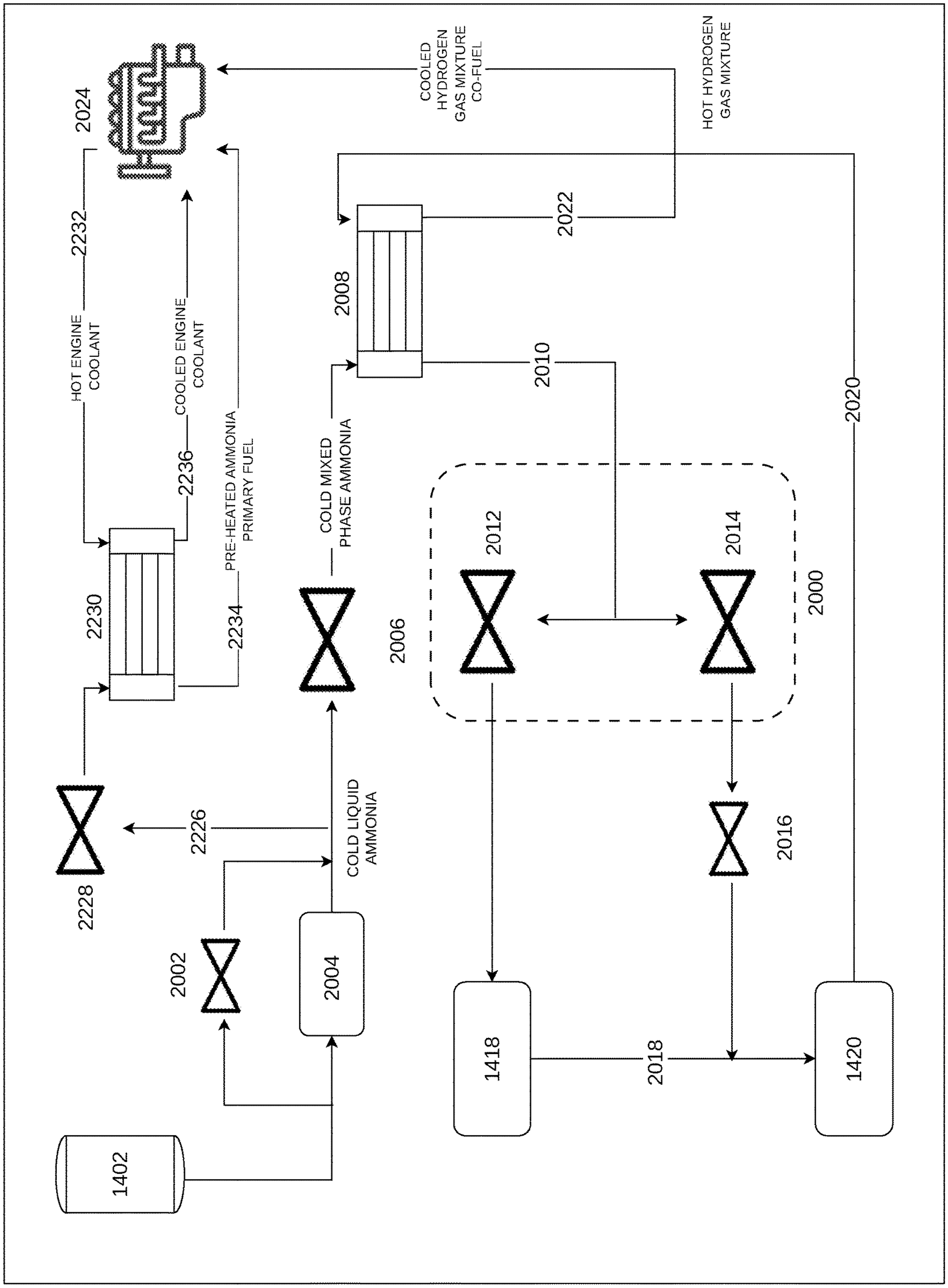
FIG. 20 is a block diagram of a exhaust gas cracking unit bypass system, according to an embodiment of the present invention.

FIG. 20 is a block diagram of a exhaust gas cracking unit bypass system 2000. In an embodiment, during starting of the engine 2042, liquid ammonia from the ammonia tank 1402 flows to a check valve 2002 which is arranged in parallel with a liquid ammonia pump 2004. This configuration permits selective flow of liquid ammonia either through the pump 2004 or through the check valve 2002, depending on the vapor pressure within the ammonia tank 1402 and the prevailing engine and ambient conditions.

During normal operation, when the temperature of the ammonia tank 1402 is sufficiently high such that the vapor pressure within the ammonia tank 1402 exceeds a predetermined threshold, the pressure differential across the pump 2004 is adequate to drive the ammonia flow through the check valve 2002 without requiring activation of the pump 2002. In this mode, the check valve 2002 opens passively under the influence of the pressure within the ammonia tank 1402, permitting liquid ammonia to flow downstream. The pump 2004 remains inactive, thereby reducing parasitic electrical load and improving overall system efficiency.

Conversely, under cold ambient conditions, when the temperature of the ammonia tank 1402 is low and the vapor pressure of the stored ammonia falls below the level required to overcome downstream flow resistance, the check valve 2002 remains in a normally closed position. In this state, the pressure differential across the check valve 2002 is insufficient to open it, preventing reverse flow or vapor ingress from the downstream side. The ECU then activates the pump 2004 to establish positive pressure and deliver liquid ammonia downstream to the expansion valve 2006.

In an embodiment, the parallel arrangement of the check valve 2002 ensures that the flow path through the pump 2004 is only utilized when necessary, and that the system can seamlessly transition between passive (pressure-driven) and active (pump-driven) ammonia feed modes. This configuration ensures reliable ammonia delivery under a wide range of ambient conditions.

After leaving the ammonia tank 1402, the cold liquid ammonia flows from the pump 2004 to the expansion valve 2006, and also to the expansion valve 2228 via supply line 2226, which is described in more detail herein. In an embodiment, the expansion valve 2006 removes pressure from the cold liquid ammonia, resulting in a cold mixed-phase (i.e., liquid and gas) ammonia. The cold mixed-phase ammonia flows from the expansion valve 2006 to an inlet at the top of the heat-exchanger 2008.

In an embodiment, the expansion valve 2006 may be a thermostatic, electronically actuated, or pressure-regulated type, responsive to one or more system parameters such as downstream temperature, pressure, or flow demand. In one embodiment, opening of the expansion valve 2006 is modulated by the ECU to maintain a consistent outlet temperature or vapor quality of the ammonia entering the heat-exchanger 2008.

The heat-exchanger 2008 serves to pre-heat the cold mixed-phase ammonia. The cold mixed-phase ammonia is heated as it traverses the heat-exchanger 2008 and changes to a gaseous state; if the temperature of the gaseous ammonia drops below a threshold temperature, the gaseous ammonia can change into a liquid state. In an embodiment, the heat-exchanger 2008 is in the form of a plate heat-exchange unit with a structure consisting of a series of parallel plates that allows heat-exchange via a parallel flow of the cold ammonia and the hot hydrogen gas mixture resulting from on-board ammonia cracking by the heat exchange cracking unit 1418 or the electric cracking unit 1420, as described in more detail herein.

The gaseous ammonia exits the heat-exchanger 2008 through a vapor outlet and is directed downstream toward the ammonia cracking units 1418, 1420 via supply line 2010. In an embodiment, the supply line 2010 is coupled to a dual-solenoid bypass arrangement comprising a normally open (NO) solenoid valve 2012 and a normally closed (NC) solenoid valve 2014. The NO valve 2012 is positioned in a flow path leading to the heat exchange cracking unit 1418, while the NC valve 2014 is positioned in another flow path leading to the electric cracking unit 1420. In an embodiment, a check valve 2016 is disposed in series between the NC valve 2014 and the inlet of the electric cracking unit 1420. The NO valve 2012 and the NC valve 2014 collectively define a bypass system that selectively directs gaseous ammonia flow between the heat exchange cracking unit 1418 and the electric cracking unit 1420.

During cold-start conditions, when the engine exhaust is not yet producing sufficient thermal energy to heat the heat exchange cracking unit 1418, the ECU actuates the solenoid valves such that the NO valve 2012 closes and the NC valve 2014 opens. This configuration establishes a bypass path that directs the gaseous ammonia flow away from the unheated heat exchange cracking unit 1418 and directly toward the electric cracking unit 1420. The electric cracking unit 1420 thereby functions as both a vapor preheater and a cracking reactor, ensuring immediate and stable ammonia dissociation when exhaust gas is unavailable. This functionality also prevents the entry of cold or partially condensed ammonia into the heat exchange cracking unit 1418, mitigating the risk of condensation, volume expansion, and associated mechanical stress within the passages of the heat exchange cracking unit 1418 which can lead to thermal shock or structural damage.

In an embodiment, as the internal combustion engine 2024 warms and exhaust gas temperature rises to a level sufficient to sustain cracking reactions in the heat exchange cracking unit 1418, the ECU reverses the solenoid valve states and the NO valve 2012 returns to its normally open position, reestablishing flow to the heat exchange cracking unit 1418, while the NC valve 2014 closes to isolate the electric cracking unit 1420. In this operating state, the gaseous ammonia first passes through the heat exchange cracking unit 1418, where it undergoes endothermic dissociation using recovered exhaust gas, resulting in the hot hydrogen gas mixture comprising primarily hydrogen, nitrogen, and residual ammonia. The hot hydrogen gas mixture then flows to the electric cracking unit 1420 via supply line 2018.

The check valve 2016 positioned between the NC valve 2014 and the electric cracking unit 1420 prevents reverse flow of the high-temperature hot hydrogen gas mixture from the heat exchange cracking unit 1418 toward the NC valve 2014 when the NC valve 2014 is closed. This feature prevents undesirable thermal conduction and protects the NC valve 2014 from exposure to elevated temperatures that could impair valve performance or sealing integrity.

Upon exiting the electric cracking unit 1420, the hot hydrogen gas mixture having a high temperature due to the endothermic nature of the ammonia dissociation reaction, flows to an inlet of the heat-exchanger 2008 via supply line 2020. In an embodiment, the hot hydrogen gas mixture is routed through an internal passage or heat-exchange channel within the heat-exchanger 2008.

Within the heat-exchanger 2008, the hot hydrogen gas mixture undergoes a heat exchange with the incoming cold mixed-phase ammonia supplied from the expansion valve 2006. The hot hydrogen gas flows through a passage in thermal communication with the ammonia passage of the heat-exchanger 2008. As the cold mixed-phase ammonia traverses the heat-exchanger 2008, it absorbs heat from the hot hydrogen gas mixture, causing the remaining liquid fraction of the mixed-phase ammonia to vaporize and producing a substantially gaseous ammonia which is output to supply line 2010 and flows to the dual-solenoid bypass arrangement.

This counterflow heat exchange not only promotes efficient ammonia vaporization but also recovers waste heat from the hot hydrogen gas mixture, thereby improving overall system thermal efficiency and reducing the electrical power demand on the electric cracking unit 1420 during steady-state operation of the internal combustion engine 2024.

After transferring heat to the cold liquid ammonia, the cooled hydrogen gas mixture exits the heat-exchanger 2008 through a gas outlet, and flows to the engine intake system of the internal combustion engine 2024 via supply line 2022 to be used as a co-fuel with ammonia.

In an embodiment, the internal combustion engine 2024 is configured to operate using ammonia as a primary fuel and the cracked hydrogen as a co-fuel. The liquid ammonia stored in the ammonia tank 1402 is supplied to the internal combustion engine 2024 through supply line 2226 as a primary fuel, while a portion of the liquid ammonia is directed to the on-board ammonia dissociation system to generate the hydrogen co-fuel as described herein.

In an embodiment, the ammonia primary fuel is supplied to the internal combustion engine 2024 in a vaporized state rather than as a liquid. Vapor-phase delivery is required to ensure uniform mixing with intake air and to form a homogeneous combustible mixture, which is critical given the relatively slow flame speed and narrow flammability limits of ammonia. Liquid ammonia introduced directly into the intake manifold or combustion chamber may absorb significant heat during vaporization, potentially reducing the local mixture temperature, inhibiting ignition, and causing incomplete combustion.

Moreover, the rapid phase change from liquid to vapor can result in localized high pressures or thermal shock, which could damage engine components such as injectors, intake surfaces, or valves. Vaporization also facilitates precise metering of the ammonia primary fuel, ensures proper blending with hydrogen co-fuel generated onboard, and improves combustion efficiency and stability across a range of operating conditions.

To deliver the ammonia primary fuel as a vapor to the evaporator 2230, an expansion valve 2228 receives the cold liquid ammonia via supply line 2226. In an embodiment, the expansion valve 2230 is arranged between the ammonia tank 1402 and the evaporator 2230. The expansion valve 2228 is configured to regulate the pressure and temperature of the ammonia prior to its entry into the evaporator 2230. The expansion valve 2228 serves to reduce the pressure of the liquid ammonia drawn from the ammonia tank 1402, thereby initiating vaporization.

In an embodiment, the expansion valve 2228 is designed to throttle the ammonia flow and produce a controlled pressure drop, resulting in the formation of gaseous ammonia or a mixed-phase mixture of liquid and gaseous ammonia.

In an embodiment, the expansion valve 2228 may be a thermostatic, electronically actuated, or pressure-regulated type, responsive to one or more system parameters such as downstream temperature, pressure, or flow demand. In one embodiment, opening of the expansion valve 2228 is modulated by the ECU to maintain a consistent outlet temperature or vapor quality of the ammonia entering the evaporator 2230.

By lowering the pressure of the ammonia prior to preheating, the expansion valve 2228 ensures that the evaporator 2230 operates efficiently within a safe temperature range and prevents localized overheating or excessive pressure buildup. The resulting gaseous ammonia, or partially vaporized ammonia, can then be fully vaporized in the evaporator 2230 using engine coolant heat, producing a stable gaseous ammonia fuel stream suitable for supply to the engine's intake manifold or injection system.

To mitigate the risk of liquid ammonia being supplied to the engine intake system, a pre-heater, such as evaporator 2230, is positioned between the ammonia tank 1402 and the engine intake system, and utilizes hot engine coolant as the thermal source. The evaporator 2230 comprises a first flow path configured to receive cold liquid ammonia from the ammonia tank 1402 via supply line 2226, and a second flow path configured to receive hot engine coolant from the engine's cooling via supply line 2232. The two flow paths are in thermal communication but remain fluidly isolated, such that heat is transferred from the hot coolant to the liquid ammonia without intermixing of fluids.

During warm-up of the internal combustion engine 2024, as the engine coolant temperature rises, the hot engine coolant is circulated through the heat exchanger 2228. The cold liquid ammonia entering the heat exchanger 2228 from the ammonia tank 1402 absorbs heat from the hot engine coolant, increasing its temperature to a predetermined threshold sufficient to cause partial or complete vaporization. The pre-heated ammonia is then supplied to the engine intake system of the internal combustion engine 2024 via supply line 2234.

After transferring heat to the cold liquid ammonia within the heat exchanger 2228, the engine coolant is cooled relative to its inlet temperature. The cooled engine coolant exits the heat exchanger 2228 and is returned to the engine's cooling circuit via supply line 2236. By returning the coolant to the engine's cooling circuit, the evaporator 2230 forms a closed-loop, auxiliary heat exchange circuit that does not interfere with the primary engine cooling function but recovers waste heat for ammonia pre-heating.

In an embodiment, a flow control valve, thermostatic bypass, or check valve may be included in the path of supply line 2234 to regulate flow and maintain the desired ammonia heating rate while ensuring proper engine coolant circulation and temperature control. This arrangement ensures that engine cooling performance is not compromised while enabling effective pre-heating of the ammonia fuel prior to combustion.

In an embodiment, during cold-start conditions, when the engine coolant temperature is initially low, the evaporator 2230 may be bypassed or supplemented by electrical heating elements or by utilizing heat recovered from the electric cracking unit 1420. As engine operation continues and coolant temperature increases, a thermostatic control valve or solenoid-actuated bypass valve (not shown in FIG. 20) can direct the ammonia flow through the heat exchanger 2228 to maintain the desired fuel delivery temperature.

The evaporator 2230 enables stable ammonia vapor delivery during all phases of engine operation, improving ignition reliability and combustion efficiency while reducing ammonia slip in the exhaust. Furthermore, the use of recovered engine coolant heat minimizes electrical energy demand and leverages existing thermal energy within the engine system, enhancing overall energy efficiency.

Within the internal combustion engine 2024, the hydrogen produced on-board functions as a combustion promoter. When mixed with the primary ammonia fuel, the hydrogen improves the ignition characteristics, flame stability, and combustion completeness of the fuel mixture. This results in enhanced engine performance, reduced unburned ammonia emissions, and improved overall thermal efficiency.

In am embodiment, the ratio of ammonia to hydrogen supplied to the engine is dynamically controlled based on engine load, temperature, and exhaust conditions by the ECU. During cold start or low-load conditions, the ECU may increase hydrogen proportion to assist ignition and smooth engine operation. As the engine and exhaust systems reach normal operating temperatures, the proportion of ammonia may be increased to optimize fuel efficiency and minimize electrical energy consumption by the on-board cracking system 1400. This integrated fuel strategy enables ammonia to serve as the primary on-board energy carrier, while hydrogen generated in situ acts as a reactive co-fuel, improving combustibility without requiring separate hydrogen storage. This results in an efficient and thermally self-sustaining ammonia fuel processing and combustion system suitable for vehicular applications.

The remaining figures have been provided to show additional details and embodiments of the on-board ammonia cracking system.

While the principles of the disclosure have been illustrated in relation to the exemplary embodiments shown herein, the principles of the present invention are not limited thereto and include any modification, variation, or permutation thereof.

The invention claimed is:

1. An on-board ammonia cracking system for supplying hydrogen fuel to an internal combustion engine, the system comprising:

an ammonia tank containing ammonia;

a heat exchange cracking unit configured to receive exhaust gas from the internal combustion engine and crack ammonia using heat transferred from the exhaust gas;

an electric cracking unit coupled to the heat exchange cracking unit; and a bypass system coupled to the ammonia tank, the heat exchange cracking unit, and the electric cracking unit, wherein the bypass system routes ammonia from the ammonia tank to the heat exchange cracking unit when the internal combustion engine is producing exhaust gas at a temperature sufficient to heat the heat exchange cracking unit to a threshold temperature suitable to perform ammonia cracking in the heat exchange cracking unit, and wherein the bypass system routes ammonia to the electric cracking unit when the internal combustion engine is not producing exhaust gas at a temperature sufficient to heat the heat exchange cracking unit to a threshold temperature suitable to perform ammonia cracking in the heat exchange cracking unit.

2. The system of claim 1, wherein an outlet of the heat exchange cracking unit is coupled to an inlet of the electric cracking unit.

3. The system of claim 1, wherein the bypass system includes a first valve coupled to the heat exchange cracking unit and a second valve coupled to the electric cracking unit.

4. The system of claim 3, wherein when the first valve is open, the second valve is closed, and wherein when the first valve is closed, the second valve is open.

5. The system of claim 3, wherein the first valve and the second valve are each solenoid valves.

6. The system of claim 1, further comprising a check valve positioned between the bypass system and the electric cracking unit.

7. The system of claim 1, further comprising an electronic control unit (ECU) coupled to the bypass system, wherein the ECU actuates the bypass system based on a temperature of the exhaust gas.

8. An on-board ammonia cracking system for supplying hydrogen fuel to an internal combustion engine, the system comprising:

an ammonia tank containing ammonia;

a heat exchange cracking unit configured to receive exhaust gas from the internal combustion engine and crack ammonia using heat transferred from the exhaust gas;

an electric cracking unit coupled in series to the heat exchange cracking unit;

a first valve coupled between the ammonia tank and the heat exchange cracking unit;

a second valve coupled between the ammonia tank and the electric cracking unit; and an electronic control unit (ECU) coupled to the first valve and the second valve, wherein the ECU closes the first valve to prevent ammonia flow to the heat exchange cracking unit and opens the second valve to allow ammonia flow to the electric cracking unit when the internal combustion engine is not producing exhaust gas at a temperature sufficient to heat the heat exchange cracking unit to a threshold temperature suitable to perform ammonia cracking in the heat exchange cracking unit.

9. The system of claim 8, wherein the first valve and the second valve are each solenoid valves.

10. The system of claim 8, further comprising a check valve positioned between the second valve and the electric cracking unit.

11. The system of claim 10, wherein the check valve prevents a reverse flow of a hydrogen gas mixture output from the heat exchange cracking unit from flowing to the second valve when the first valve is open.

12. The system of claim 8, wherein a supply line supplies ammonia from the ammonia tank to the first valve and to the second valve.

13. The system of claim 8, wherein the ECU opens the first valve to allow ammonia flow to the heat exchange cracking unit and closes the second valve to prevent ammonia flow to the electric cracking unit when the internal combustion engine is producing exhaust gas at a temperature sufficient to heat the heat exchange cracking unit to a threshold temperature suitable to perform ammonia cracking in the heat exchange cracking unit.

14. An on-board ammonia cracking system for supplying hydrogen fuel to an internal combustion engine, the system comprising:

an ammonia tank containing ammonia;

a heat exchange cracking unit configured to receive exhaust gas from the internal combustion engine and crack ammonia using heat transferred from the exhaust gas;

an electric cracking unit coupled in series to the heat exchange cracking unit;

a first valve coupled between the ammonia tank and the heat exchange cracking unit;

a second valve coupled between the ammonia tank and the electric cracking unit;

a check valve coupled between the second valve and the electric cracking unit; and an electronic control unit (ECU) coupled to the first valve and the second valve, wherein the ECU closes the first valve to prevent ammonia flow to the heat exchange cracking unit and opens the second valve to allow ammonia flow to the electric cracking unit when the internal combustion engine is not producing exhaust gas at a temperature sufficient to heat the heat exchange cracking unit to a threshold temperature suitable to perform ammonia cracking in the heat exchange cracking unit.

15. The system of claim 14, wherein the check valve prevents a reverse flow of a hydrogen gas mixture output from the heat exchange cracking unit from flowing to the second valve when the first valve is open.

16. The system of claim 14, wherein the first valve and the second valve are each solenoid valves.

17. The system of claim 14, wherein the ECU opens the first valve to allow ammonia flow to the heat exchange cracking unit and closes the second valve to prevent ammonia flow to the electric cracking unit when the internal combustion engine is producing exhaust gas at a temperature sufficient to heat the heat exchange cracking unit to a threshold temperature suitable to perform ammonia cracking in the heat exchange cracking unit.

18. The system of claim 14, wherein when the first valve is open, the second valve is closed, and wherein when the first valve is closed, the second valve is open.

19. The system of claim 14, wherein when the first valve is closed, entry of cold or partially condensed ammonia into the heat exchange cracking unit is prevented.

20. The system of claim 14, wherein the first valve is closed and the second valve is open during a cold start operation of the internal combustion engine.

* * * * *